United States Patent
Coulter

(10) Patent No.: US 11,921,866 B2
(45) Date of Patent: Mar. 5, 2024

(54) SYSTEM AND METHOD FOR PROTECTION OF PERSONAL IDENTIFIABLE INFORMATION

(71) Applicant: Consumer Direct, Inc., Irvine, CA (US)

(72) Inventor: David B. Coulter, Tustin, CA (US)

(73) Assignee: Consumer Direct, Inc., Irvine, CA (US)

( * ) Notice: Subject to any disclaimer, the term of this patent is extended or adjusted under 35 U.S.C. 154(b) by 103 days.

(21) Appl. No.: 17/705,152

(22) Filed: Mar. 25, 2022

(65) Prior Publication Data
US 2022/0309168 A1    Sep. 29, 2022

Related U.S. Application Data

(60) Provisional application No. 63/166,797, filed on Mar. 26, 2021.

(51) Int. Cl.
*G06F 21/60*    (2013.01)

(52) U.S. Cl.
CPC .................. *G06F 21/60* (2013.01)

(58) Field of Classification Search
CPC .............. G06F 21/60; G06F 21/6245
See application file for complete search history.

(56) References Cited

U.S. PATENT DOCUMENTS

| | | | |
|---|---|---|---|
| 7,818,228 B1 | 10/2010 | Coulter | |
| 7,877,304 B1 | 1/2011 | Coulter | |
| 8,285,613 B1 | 10/2012 | Coulter | |
| 10,114,978 B2 | 10/2018 | Rajkumar et al. | |
| 11,232,489 B2 | 1/2022 | Coulter | |
| 2002/0120864 A1* | 8/2002 | Wu | G06F 21/6245 709/217 |
| 2004/0010699 A1* | 1/2004 | Shao | G06F 21/6245 713/189 |
| 2008/0243940 A1* | 10/2008 | Kato | G06F 21/6218 |
| 2009/0077096 A1* | 3/2009 | Ohama | G06F 21/575 |
| 2009/0153899 A1* | 6/2009 | Shimizu | G06F 3/1291 358/1.15 |
| 2009/0221266 A1* | 9/2009 | Ohta | H04W 12/082 455/411 |
| 2010/0153716 A1* | 6/2010 | Kirihata | H04W 12/126 713/165 |

(Continued)

*Primary Examiner* — Saleh Najjar
*Assistant Examiner* — Devin E Almeida
(74) *Attorney, Agent, or Firm* — Rutan & Tucker LLP

(57) ABSTRACT

Embodiments disclosed herein are directed to a system and method configured to create a PII profile of the user and monitor data brokers for PII that matches the PII profile. For each data broker, the system can determine a threat level to the user and provide a dynamically updatable user interface configured to present the data brokers in a predetermined order, e.g. descending order of threat. The system can be configured to receive a swipe input from the user to either "Opt-Out" or "Remove" the user PII. "Opting-Out" can include preventing the data broker from selling or sharing the user PII. "Removing" can include requesting the data broker to delete all PII for the user. The system can then monitor the data broker for compliance with the request. Further, the system can provide a user interface to the data broker to petition the user for continued use of the PII.

23 Claims, 14 Drawing Sheets

(56) References Cited

U.S. PATENT DOCUMENTS

| | | | |
|---|---|---|---|
| 2010/0299737 A1* | 11/2010 | Ueno | G06F 21/31 |
| | | | 726/7 |
| 2011/0166988 A1 | 7/2011 | Coulter | |
| 2012/0311717 A1* | 12/2012 | McCarty | G06Q 10/08 |
| | | | 726/26 |
| 2014/0095682 A1* | 4/2014 | Yablokov | H04W 12/37 |
| | | | 709/223 |
| 2014/0285834 A1* | 9/2014 | Yamazaki | G06K 15/02 |
| | | | 358/1.14 |
| 2016/0381494 A1* | 12/2016 | Hamada | H04W 76/16 |
| | | | 370/315 |
| 2018/0144155 A1* | 5/2018 | Wu | G06F 21/6209 |
| 2018/0308317 A1 | 10/2018 | Coulter | |
| 2018/0341783 A1* | 11/2018 | Barday | G06F 9/4881 |
| 2019/0044978 A1* | 2/2019 | Barday | G06F 21/6245 |
| 2019/0303610 A1* | 10/2019 | Bodegas Martinez | |
| | | | G06F 16/152 |
| 2019/0354716 A1* | 11/2019 | Basava | G06F 16/2379 |
| 2020/0004989 A1* | 1/2020 | Lockhart, III | G06F 21/6263 |
| 2020/0074546 A1 | 3/2020 | Coulter | |
| 2020/0133599 A1* | 4/2020 | Shibuya | G06F 3/1264 |
| 2020/0159935 A1 | 5/2020 | Krishnamurthy et al. | |
| 2020/0250333 A1* | 8/2020 | Nemoto | G06F 16/1865 |
| 2020/0293679 A1* | 9/2020 | Handy Bosma | G06F 21/6245 |
| 2021/0233166 A1 | 7/2021 | Coulter | |
| 2021/0234713 A1* | 7/2021 | Nagasawa | H04L 12/1485 |
| 2021/0383370 A1* | 12/2021 | Tippets | G06Q 20/383 |
| 2022/0012727 A1* | 1/2022 | Yamazaki | G06Q 20/3827 |

* cited by examiner

 smartcredit® 

$1 Million in coverage for your whole family. Free with your membership. Activation is required.

View Coverage ˅

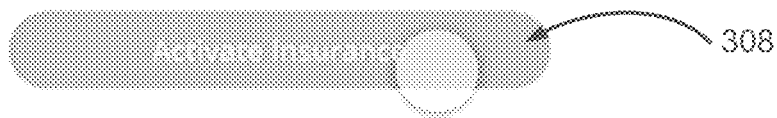 — 308

For questions call Customer Service:
(877) 555-5555

Insurance provided by

PrivacyMaster™

We continuously scan and monitor for websites & data brokers who might be selling or misusing your personal information and alert you when discovered.

You can then instruct them to Opt-Out of their sharing or selling your personal information. Or you can instruct them to completely Remove your personal information providing you do not have an open account with them.

We will monitor their compliance with your Opt-Out or Remove instructions.

You will get periodic alerts with updates and results. Your results may take from 1 to 45 days depending upon the responsiveness of the website or data broker's compliance with your instructions. Results are not guaranteed and may vary.

Learn More ˅

20
Websites
to Review

 — 306

Please activate your fraud insurance
to have access to this feature.

FIG. 4

IMPORTANT: Before accessing PrivacyMaster℠ you need to activate your free $1 million fraud insurance Coverage included at no Cost:

- Zero Deductible
- Covers your entire family residing in your household
- Covers your Bank, Savings, Brokerage, Lines of Credit, Credit Card and more
- Covers your cash out of pocket expenses incurred in your ID recovery
- Covers your Credit Reports
- Covers pre-existing Identity Fraud you didn't know about
- Replacement cost due to stolen Driver's License
- Replacement cost due to stolen Passport

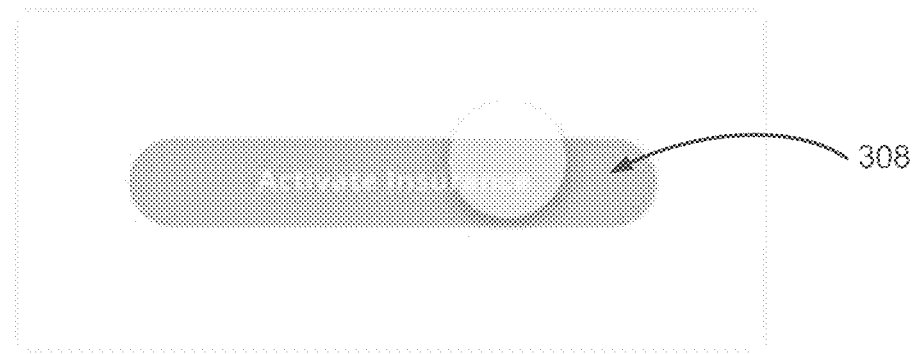 — 308

*Identity fraud expense reimbursement is provided by

 — 310

Not Now

FIG. 5

IMPORTANT: Before accessing PrivacyMaster™ you need to activate your free $1 million fraud insurance Coverage included at no Cost:

* Zero Deductible
* Covers your entire family residing in your household
* Covers your Bank, Savings, Brokerage, Lines of Credit, Credit Card and more
* Covers your cash out of pocket expenses incurred in your ID recovery
* Covers your Credit Reports
* Covers pre-existing Identity Fraud you didn't know about
* Replacement cost due to stolen Driver's License
* Replacement cost due to stolen Passport

FIG. 6

FIG. 11

SYSTEM AND METHOD FOR PROTECTION OF PERSONAL IDENTIFIABLE INFORMATION

RELATED APPLICATIONS

This application claims the benefit of priority to U.S. Provisional Application No. 63/166,797, filed Mar. 26, 2021, which is incorporated by reference in its entirety into this application.

The following patents and publications are related to the subject matter of this application and are incorporated by reference in their entireties into this application: U.S. Pat. Nos. 7,818,228, 7,877,304, 8,285,613, US 2011/0166988, U.S. Pat. No. 11,232,489, US 2020/0074546, and US 2021/0233166.

SUMMARY

Embodiments disclosed herein are directed to a system and method for the protection of personal identifiable information. The system can be configured to receive personal identifiable information (PII) from a user and retrieve additional personal identifiable information (PII) from either a local data store or from a third party data store, to create a PII profile of the user. The system can then monitor data brokers, websites or similar third party data stores (termed "data brokers") that have PII which matches some or all of the PII profile of the user. The system can also determine if the data broker is selling or misusing the user PII. As used herein, the term "misusing PII" can include possessing, using, selling, or sharing the PII without the permission of the user. The system can then alert the user to one or more data brokers that may be using, selling, sharing, or misusing the user PII. For each data broker, the system can determine a threat level to the user and then provide a dynamically updatable user interface configured to present the data brokers, as data broker profiles, in a dynamically updatable order, for example by descending order of threat to the user.

The system can be configured to receive an input from the user to indicate whether to "Opt-Out" or "Remove" the user PII data, for example, by way of a swipe-based user input system. As used herein "Opting-Out" can include allowing the data broker to keep the user PII while explicitly preventing the data broker from selling or sharing the user information with a third party. As used herein "Removing" can include explicitly requesting the data broker to delete any PII for the user. Once the "Opt-Out" or "Remove" request has been received by the system from the user, the system can transmit the request to the data broker. The system can then monitor the data broker for compliance with the request.

In an embodiment of the invention, in receiving the request from the user, the system can then provide a data broker interface to the data broker, configured to allow the data broker to communicate back to the user, by way of the system in order to maintain anonymity of the user, and to provide an explanation of the type or amount of PII they are in possession of, how the data broker obtained the PII, and how the data broker uses the PII of the user. In an embodiment, the system can receive responses from the data broker, for the user, for continued use of the PII in their possession and/or within specified, refined, narrowed ways, or to request new or different PII data. In an embodiment, the data broker can send the user a survey including one or more questions. In an embodiment, the data broker can provide an explanation of advantages to the user in a real world and/or online situation. In an embodiment the data broker can offer compensation to the user for continued use of the PII, for specified, refined, or narrowed use of the PII, or for new or different PII, or for completing a survey. In an embodiment, the system can include a rating logic configured to allow a user to rate their experiences with the data broker. The rating for the data broker can be viewed by the user, or other users of the system, or by non-users of the system.

Advantageously, the system can actively search for data brokers that may be unknown to the user and provide a quantifiable means for determining which data brokers possess user PII, and which pose the most threat to the user. The user can then action the data brokers in descending order of threat to the user, although filtering and sorting the data brokers by other criteria is also contemplated. Further, the system can send requests on behalf of the user(s) to provide anonymity to the user(s) and prevent the data broker from gleaning additional PII.

Disclosed herein a method of protecting personally identifiable information (PII) including, establishing a PII profile for a first user, monitoring one or more data brokers for PII that relates to the first user, determining a threat level to the first user for a data broker of the one or more data brokers, by analyzing, in part using one or more predetermined rule sets and weightings or machine learning schema, one or more of, i) the type or sensitivity of PII for the first user possessed by the data broker, ii) the amount of PII for the first user possessed by the data broker, and iii) the amount of PII for the first user, which is shared or sold by the data broker with a third party, rendering a dynamically updatable interface providing one or more data broker profiles arranged in order of threat level to the first user, and responsive to receiving an input to the dynamically updatable interface, sending a request to the data broker or removing the data broker profile from the dynamically updatable interface.

In some embodiments, the step of establishing the PII profile includes requesting an input from the first user for an initial PII and querying a third party data store for additional PII about the first user.

In some embodiments, monitoring one or more data brokers for PII that relates to the first user includes analyzing information retrieved from the one or more data brokers with information retrieved from the PII profile, and using one or more predetermined rule sets and weightings to determine an accuracy score for the information retrieved from the one or more data brokers, to predict if the information from the one or more data brokers is related to the first user.

In some embodiments, the method further includes receiving an input from the first user to confirm or reject the information retrieved from the one or more data brokers as relating to the first user, and training a machine learning schema to iteratively improve the accuracy score.

In some embodiments, determining the threat level to the first user further includes analyzing, using one or more predetermined rule sets and weightings, one or more of, i) the industry that the data broker is associated with, ii) a user experience rating associated with the data broker as provided by one or more second users, and iii) a compliance score determined by a response by the data broker to a request from one or more second users.

In some embodiments, the method further includes processing the PII that related to the first user from the data broker using a machine learning model that is trained in part using historical data from the data broker and one or more second users, to extract feature vectors from the information and assign weightings to the feature vectors to determine a threat score for the data broker.

In some embodiments, a data broker profile of the one or more data broker profiles represents the data broker of the one or more data brokers.

In some embodiments, the dynamically updatable interface is provided on a touch sensitive screen and wherein receiving an input to the dynamically updatable interface includes swiping the data broker profile in a first direction to provide a first request and swiping the data broker profile in a second direction, opposite the first direction, to provide a second request.

In some embodiments, sending the request to the data broker includes one of requesting deleting the PII from a data store of the data broker, or requesting to the data broker to not share or sell the PII of the first user.

In some embodiments, the method further includes notifying the first user when the request to delete the PII has been complied with.

In some embodiments, determining a threat level to the first user for a data broker further includes processing a compliance score for the data broker using a machine learning model that is trained, in part, using one or both of, i) a time elapsed between a request to delete a PII for a second user is sent to the data broker and the PII for the second user being deleted by the data broker, and ii) a time elapsed between a request not to share or sell a PII for the second user is sent to the data broker and the data broker sharing or selling the PII for the second user with a third party, and to predict the threat level to the first user for the data broker.

In some embodiments, the method further includes responsive to receiving an input for selecting one or more filters and selecting one or more data broker profile's, sending the request to the one or more data brokers, wherein the one or more filters is selected from a group consisting of a threat level filter, an amount of PII filter, a type of PII filter, an age of the PII filter, and a user rating filter.

In some embodiments, the method further includes responsive to sending a request to the data broker, providing a user interface to the data broker for the data broker to provide a survey to the first user, including one or more of, i) a response for the data broker to comply with the request from the first user, ii) an explanation of the type or amount of PII the data broker is in possession of, iii) an explanation of how the data broker obtained the PII of the first user, iv) an explanation of how the data broker uses the PII of the first user, v) a petition for continued use of the PII for the first user by the data broker, vi) an explanation of advantages to the first user for continued use of the PII for the first user, and vii) an offer compensation to the user for continued use of the PII for the first user.

Also disclosed is a non-transitory computer readable medium, when processed by one or more processors, cause the one or more processors to execute, a PII logic configured to establish a PII profile for a first user including personally identifiable information (PII), a data broker logic configured to, analyze one or more data brokers for PII that relates to the first user, and determine a threat level to the first user for a data broker of the one or more data brokers, by analyzing, in part using one or more predetermined rule sets and weightings, or machine learning schema, one or more of, i) the type or sensitivity of PII for the first user possessed by the data broker, ii) the amount of PII for the first user possessed by the data broker, and iii) the amount of PII for the first user, which is shared or sold by the data broker with a third party, and a user interface logic configured to render a dynamically updatable interface including one or more data broker profiles arranged in order of threat level to the first user, and configured to receive an input, and responsive to the input, send a request to the data broker or remove the data broker profile from the dynamically updatable interface.

In some embodiments, the PII logic is further configured request an input from the first user for an initial PII and query a third party data store for additional PII about the first user.

In some embodiments, the data broker logic is further configured to analyze information retrieved from the one or more data brokers and information retrieved from the PII profile, and use one or more predetermined rule sets and weightings to determine an accuracy score for the information retrieved from the one or more data brokers, to predict if the information from the one or more data brokers is related to the first user.

In some embodiments, the data broker logic is further configured to receive an input from the first user to confirm or reject the information retrieved from the one or more data brokers as relating to the first user, and using the input to train a machine learning schema to iteratively improve the accuracy score.

In some embodiments, the data broker logic is further configured to determine the threat level to the first user by analyzing, using one or more predetermined rule sets and weightings, one or more of, i) the industry that the data broker is associated with, ii) a user experience rating associated with the data broker as provided by one or more second users, and iii) a compliance score determined by a response by the data broker to a request from one or more second users.

In some embodiments, a data broker profile of the one or more data broker profiles represents the data broker of the one or more data brokers.

In some embodiments, the dynamically updatable interface is provided on a touch sensitive screen and wherein receiving an input to the dynamically updatable interface includes swiping the data broker profile in a first direction to provide a first request and swiping the data broker profile in a second direction, opposite the first direction, to provide a second request.

In some embodiments, sending the request to the data broker includes one of a "Remove" request that requests the data broker to delete the PII from a data store of the data broker, or and "Opt-Out" request that requests the data broker to not share or sell the PII of the first user.

In some embodiments, the data broker logic is further configured to determine a threat level to the first user for a data broker by processing a compliance score for the data broker using a machine learning model that is trained, in part, using one or both of, i) a time elapsed between a request to delete a PII for a second user is sent to the data broker and the PII for the second user being deleted by the data broker, and ii) a time elapsed between a request not to share or sell a PII for the second user is sent to the data broker and the data broker sharing or selling the PII for the second user with a third party, and to predict the threat level to the first user for the data broker.

In some embodiments, the user interface logic is further configured to, receive an input to select one or more filters and select one or more data broker profile's, and send the request to the one or more data brokers, wherein the one or more filters is selected from a group consisting of a threat level filter, an amount of PII filter, a type of PII filter, an age of the PII filter, and a user rating filter.

In some embodiments, the non-transitory computer readable medium further includes a petition logic configured to provide a user interface to the data broker and to provide a survey for the first user including one or more of, i) a response for the data broker to comply with the request from the first user, ii) an explanation of the type or amount of PII the data broker is in possession of, iii) an explanation of how the data broker obtained the PII of the first user, iv) an explanation of how the data broker uses the PII of the first user, v) a petition for continued use of the PII for the first user by the data broker, vi) an explanation of advantages to the first user for continued use of the PII for the first user, and vii) an offer compensation to the first user for continued use of the PII for the first user.

Also disclosed is a network device including, one or more processors, and memory communicatively coupled with the one or more processors, the memory comprises machine readable instructions that when executed by the one or more processors, cause the one or more processors to execute, a PII logic configured to establish a PII profile for a first user including personally identifiable information (PII), a data broker logic configured to, analyze one or more data brokers for PII that relates to the first user, and determine a threat level to the first user for a data broker of the one or more data brokers, by analyzing, in part using one or more predetermined rule sets and weightings, or machine learning schema, one or more of, i) the type or sensitivity of PII for the first user possessed by the data broker, ii) the amount of PII for the first user possessed by the data broker, and iii) the amount of PII for the first user, which is shared or sold by the data broker with a third party, and a user interface logic configured to render a dynamically updatable interface including one or more data broker profiles arranged in order of threat level to the first user, and configured to receive an input, and responsive to the input, send a request to the data broker or remove the data broker profile from the dynamically updatable interface.

BRIEF DESCRIPTION OF THE DRAWINGS

To further clarify embodiments of the disclosure, a more particular description will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIGS. 4-6 illustrate exemplary screenshots of activating identify theft insurance of the system of FIG. 1, in accordance with embodiments disclosed herein.

FIGS. 8-11 illustrate exemplary screenshots of a user interface receiving one or more inputs, in accordance with embodiments disclosed herein.

Figure 1:
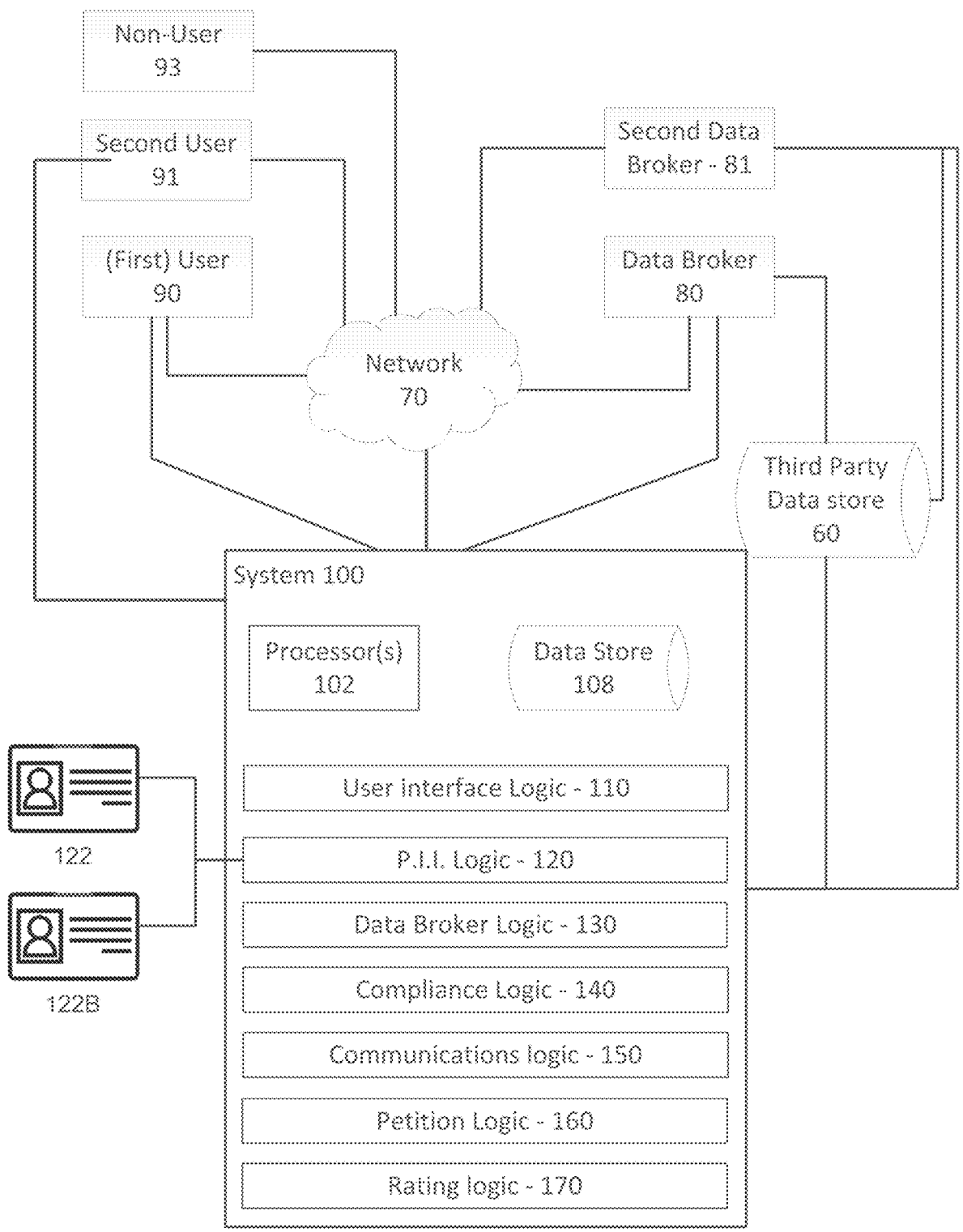
FIG. 1 illustrates an exemplary architecture of a system, in accordance with embodiments disclosed herein.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

Terminology

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "a first actionable element," may be made. However, the specific numeric reference should not be interpreted as a literal sequential order but rather interpreted that the "first actionable element" is different than a "second actionable element." Thus, the specific details set forth are merely exemplary. The specific details may be varied from and still be contemplated to be within the spirit and scope of the present disclosure. The term "coupled" is defined as meaning connected either directly to the component or indirectly to the component through another component, where the connection may enable communications between these components.

As used herein, the term "communication" generally refers to related data that is received, transmitted, or exchanged within a communication session. The data may include a plurality of packets, where a "packet" broadly refers to a series of bits or bytes having a prescribed format. Alternatively, the data may include a collection of data that may take the form of an individual or a number of packets carrying related payloads, e.g., a single webpage received over a network. Further, as used herein, the terms "about," "approximately," or "substantially" for any numerical values or ranges indicate a suitable dimensional tolerance that allows the part or collection of components to function for its intended purpose as described herein.

In the following description, certain terminology is used to describe features of the invention. For example, in certain situations, the term "logic" is representative of hardware, firmware and/or software that is configured to perform one or more functions. As hardware, logic may include circuitry having data processing or storage functionality. Examples of such circuitry may include, but are not limited or restricted to a microprocessor, one or more processor cores, a programmable gate array, a microcontroller, a controller, an application specific integrated circuit ("ASIC"), wireless receiver, transmitter and/or transceiver circuitry, semiconductor memory, or combinatorial logic.

Alternatively, logic may be software, such as executable code in the form of an executable application, an Application Programming Interface (API), a subroutine, a function, a procedure, an applet, a servlet, a routine, source code, object code, a shared library/dynamic load library, or one or more instructions. The software may be stored in any type of a suitable non-transitory storage medium, or transitory storage medium (e.g., electrical, optical, acoustical or other form of propagated signals such as carrier waves, infrared signals, or digital signals). Examples of a non-transitory storage medium may include, but are not limited or restricted to a programmable circuit; semiconductor memory; non-persistent storage such as volatile memory (e.g., any type of random access memory "RAM"); or persistent storage such as non-volatile memory (e.g., read-only memory "ROM," power-backed RAM, flash memory, phase-change memory, etc.), a solid-state drive, hard disk drive, an optical disc drive, or a portable memory device. As firmware, the executable code may be stored in persistent storage.

The term "computing device" may be construed as electronics with data processing capabilities and/or a network interface capabilities, such as network connectivity to a physical or virtual network such as a public network (e.g., Internet), a private network (e.g., a wireless data telecommunication network, a local area network "LAN", etc.), a public cloud network, a virtual private cloud, of the like. Examples of a computing device may include, but are not limited or restricted to, the following: a server, an endpoint device (e.g., a laptop, a smartphone, a "wearable" device, a smartwatch, a tablet, a desktop or laptop computer, a netbook, or any general-purpose or special-purpose, user-controlled electronic device); a mainframe; a router; or the like.

The term "network" may include a public and/or private network based on wired or wireless interconnects and in a centralized or decentralized configuration. The networks may include, but are not limited or restricted to a Local Area Network (LAN), a Wireless Local Area Network (WLAN), a Virtual Private Network (VPN), intranet, internet, 'cloud' based network, or similar network configurations.

A "message" generally refers to information transmitted in one or more electrical signals that collectively represent electrically stored data in a prescribed format. Each message may be in the form of one or more packets, frames, HTTP-based transmissions, or any other series of bits having the prescribed format.

The term "computerized" generally represents that any corresponding operations are conducted by hardware in combination with software and/or firmware.

The term "Personal Identification Information" or "PII" can be any information used to identify or track an individual user and can include, but not limited to personal information, medical information, financial information, educational information, employment information, cyber information, online information, offline information, or the like.

Personal PII can include, but not limited to, full name, maiden name, mother's maiden name, aliases, titles, date of birth, place of birth, birth certificate, marriage certificate, phone numbers, e-mail addresses, usernames, social media handles, postal address, physical address, driver's license number, passport numbers, government issued identification numbers, housing information, property tax information, biometric information, facial images, facial recognition data, fingerprints, images of distinguishing marks or tattoos, handwriting information, vehicle identification numbers (VIN) or license plate of vehicles owned, title or deed numbers, or the like.

Medical PII can include, but not limited to, biometric information, fingerprints, DNA information, retina information, voice signatures, facial geometry, blood type, patient identification numbers, height, weight, hair color, eye color, skin color, ancestry, race, religion, geographical information, or the like.

Financial PII can include, but not limited, to social securing number (SSN), national insurance number, taxpayer identity information, bank account details, credit card information, financial information, or the like.

Educational PII can include, but not limited to, educational certificates, educational institution identity number, or the like.

Employment PII can include, but not limited to, business address(es), business phone number(s), business e-mails, HR identity numbers, pay stubs, or the like.

Cyber PII can include but not limited to e-mail address, user names, screen names, passwords, IP addresses, MAC addresses, or the like.

Online information can include, but not limited to, any information that can be stored or transmitted in electronic form, e.g. e-mail addresses, user names, social media handles, etc.

Offline information can include, but not limited to, any information that can be provided in a physical or tangible format, e.g. forms, physical addresses, etc.

As used herein, the term "misuse" of PII can include possessing, using, selling, or sharing the PII, without the permission of the user.

As used herein, one or more logic modules can use predetermined rule sets or weightings, machine learning models, or other artificial intelligence ("AI") schemes not limited by the present disclosure, such as artificial neural networks, supervised classification methods, logistic regression or other linear classifiers, support vector machines, quadratic classifiers, kernel estimation, decision trees, neural networks, convolutional neural networks, trained machine learning models, or learning vector quantization, or the like.

It is important to note that any company names, firms, logos, and/or websites used herein are exemplary.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition may occur only when a combination of elements, functions, steps or acts are in some way inherently mutually exclusive.

Exemplary System Architecture

FIG. 1 shows a schematic view of a system for the protection of personal identifiable information ("system") 100, and associated methods thereof. The system 100 may include one or more computing devices, such as a server, which is communicatively coupled either directly or indirectly with other computing devices, such as, for example, a user 90 computing device, and a data broker 80 computing device. As used herein, the data broker 80 can include any third party who is in possession of one or more PII of the user 90. Exemplary data brokers can include but not limited to websites, databases, data clearing houses, financial institutions, credit bureaus, marketing companies, businesses, or the like.

Each of the computing devices 100, 90 and 80 may be communicatively coupled, either directly or indirectly, through a network 70. As shown, the system 100 may be deployed as a physical server, including a one or more processors 102 and a non-transitory storage medium (e.g., memory) such as data store 108, configured to store one or more logic engines such as a user interface logic 110, a PII logic 120, a data broker logic 130, a compliance logic 140, a communications logic 150, a petition logic 160, and a rating logic 170. Alternatively, the system 100 may be deployed as a virtual server, namely software deployed within a public or private cloud network and operating as a physical server.

The data store 108, as will be discussed in more detail herein, may operate as persistent storage, such as a database configured to store information from, and provide information to the user interface logic 110, a user PII logic 120, a data broker logic 130, compliance logic 140, communications logic 150, petition logic 160, rating logic 170, or combinations thereof. It will be appreciated that other logic or databases, e.g. third party data store 60, can be communicatively coupled, either directly or indirectly, with the data store 108, without limitation.

Logic Engines

In an embodiment, the logic described herein may rely on heuristics, machine learning, artificial intelligence (A.I.), neural networks, or other data processing techniques to perform the described functionality.

Herein, according to one embodiment of the disclosure, the user interface logic 110, as will be discussed in more detail herein, may include logic configured to perform functions to generate one or more dynamically updatable user interfaces configured to receive, aggregate, collate, parse, analyze and display information to the user in a convenient, easy, and quick to understand format. The one or more dynamically updatable user interface can be provided as part of a larger system, for example a credit score system. Further details and embodiments of which can be found in U.S. Pat. No. 11,232,489 and U.S. Patent Publication 2020/0074546 which are each incorporated by reference in its entirety.

In an embodiment, the PII logic 120, as will be discussed in more detail herein, may include logic configured to perform functions to receive and store initial PII about a user 90 (e.g. a first user 90) and provided by the user 90. In an embodiment, the initial PII can be stored locally on data store 108. In an embodiment, the PII logic 120 can be configured to query one or more third party data stores 60 to compare the initial PII, provided by the user 90, with information stored by the one or more third party data stores 60. The PII logic 120 can then retrieve and store additional PII about the user 90 to provide a PII profile 122 of the user. For example, the user 90 can access the system and provide initial PII such as name, date of birth, physical address, e-mail address, social security number, or the like. The PII logic can then query third party data stores 60, for example, data brokers, financial institutions, credit bureaus, medical institutions, businesses, or the like, to retrieve additional PII about the user 90. This additional PII can include personal information, medical information, financial information, educational information, employment information, cyber information, or the like. The PII logic 120 can then collate PII about the user 90 to provide a PII profile 122. In an embodiment, the user interface logic 110 can provide a dynamically updatable PII profile user interface configured to allow the user 90 to review and verify the information within the PII profile 122 to ensure accuracy. Advantageously, the PII logic 120 can maintain a complete PII profile 122 of the user 90.

Confirmation of Data Accuracy

In an embodiment, the PII logic 120 can analyze the initial PII provided by the user 90, and additional PII retrieved from the one or more third party data stores 60 and can provide an accuracy score for each data point. The accuracy score can provide either a quantitative (e.g. a numerical score) or qualitative (e.g. low—medium—high) indication of the accuracy of the information within the PII profile 122.

The accuracy score can be based on one or more feature vectors such as, but not limited to, the source of the information (e.g. user 90 or third party data store 60), the precision of the information (e.g. does the information include typographical errors), the correlation of the information (e.g. does the data point correlate with existing data in the PII profile 122 or one or more third party data stores 60), or the like.

For example, additional PII may include a name linked with an account. Where the name matches exactly including spelling, pre-fixes, middle initials, etc. or the physical address matches with the current address in the PII profile 122, the data point and associated addresses, accounts, etc. can be given a relatively high accuracy score. However, if the parts of the data are incorrect, e.g. the middle initial is different, a mis-spelled name, or a physical address is different, then the information is given a relatively low accuracy score. Information (e.g. initial PII or additional PII) with accuracy scores that fall within a grouping or below a threshold can either be provided to the user 90 in a user interface for further confirmation, or can be rejected as not related to the user 90. In an embodiment, the grouping or thresholds can be predetermined. In an embodiment, the grouping or thresholds can be determined by the system 100 or dynamically updatable. As will be appreciated, this is a simplified example provided for illustrative purposes and not intended to be limiting in any way. Advantageously, the system 100 can determine accurate information associated with the user 90 and improve the accuracy of the information within the user profile 122. This can be important when assigning the correct information to the correct user 90 and for the accuracy of further analyses, as described herein.

Data Broker Logic

The data broker logic 130, as will be discussed in more detail herein, may include logic configured to perform functions to retrieve information from the user PII profile 122 and to monitor one or more data brokers 80 to determine if the data broker 80 possesses any information that matches information from the user PII profile 122. If the data broker 80 does possess any information from the user PII profile 122, the data broker logic 130 can then determine if the data broker 80 is misusing the information in any way, i.e. sharing or selling the PII for the user 90 and whether this is done with or without the permission of the user 90. The data broker logic 130 can determine, using predetermined rulesets or weightings, machine learning, AI schemes, or the like, a threat level to the user 90.

The threat level can be a quantitative or qualitative score based on one or more feature vectors such as, but not limited to, the type and/or amount of PII possessed by the data broker 80, shared by, or sold by the data broker 80 with one or more third parties and with or without the permission from the user 90. Additional feature vectors can include, but not limited to, the industry that the data broker 80 is in and/or a rating of the data broker 80 as provided by the rating logic 170. As described in more detail herein, a rating as provided by the rating logic 170 can include a rating from one or more second users 91 of the system 100 based on their personal experiences with the data broker 80. In an embodiment, the data broker logic 130 can further retrieve a compliance score from the compliance logic 140 to further analyze and predict a threat level for the data broker 80. As described in more detail herein, a compliance score for a data broker 80 can be based on if and/or when the data broker 80 complies with a request from the first user 90 or one or more second users 91 of the system 100.

In an embodiment, the data broker logic 130 can monitor data broker(s) 80 for information in their possession that is linked to the user 90. In an embodiment, the data broker logic 130 can determine an accuracy score, as described herein, for the information held by the data broker 80 to predict a degree of confidence that the information held by the data broker 80 is linked to the user 90. For example, the information possessed or used by the data broker 80 that has a relatively low accuracy score can be can either be provided to the user 90 in a user interface for further confirmation, or can be rejected as not related to the user 90.

In an embodiment, the data broker logic 130 can then monitor a data broker(s) 80 to analyze and predict a threat level using machine learning schema. The data broker logic 130 can review one or more:

i) if the data broker 80 possesses PII of the user 90 (e.g. by way of an accuracy score, as described herein),
ii) the type and/or amount of user PII possessed by the data broker 80,
iii) if the data broker 80 shares any user PII with a third party,
iv) the type and/or of user PII shared by the data broker 80,
v) if the data broker sells any user PII (i.e. share user PII in return for financial reward or other incentive),
vi) the type and/or amount of user PII sold by the data broker 80,
vii) the industry that the data broker 80 is associated with (financial, medical, marketing, etc.)
viii) a user experience rating as provided by the rating logic 170, and
ix) a compliance score as provided by the compliance logic 140.

The data broker logic 130 can generate the feature vectors, from labeled historical data. The labeled historical data can originate from previous interactions between the data broker 80 and the user 90, between the data broker 80 and one or more second users 91 of the system 100, or between one or more second data brokers 81 and the user 90 or one or more second users 91. Worded differently, the historical data can be used by the data broker logic 130 to train a machine learning model. The data broker logic 130 can then assign weightings to these feature vectors based on the outcome of the historical data interactions. The data broker logic 130 can then analyze the one or more feature vectors using the trained machine learning model and predict a threat level to the user 90, for each data broker 80, or for the information possessed by the data broker 80.

For example, data brokers 80 that possess only a few data points of low sensitivity information such as a name, physical address, e-mail address, or the like will be assigned a relatively low threat score since historical data between the data broker 80 and one or more second users 91 showed this to have a low impact on data breaches or identity thefts. By contrast, data brokers 80 that possess a large number of data points, and/or more sensitive information such as social security numbers, bank account details, security password information, etc. can be assigned a relatively higher threat score. Similarly, the synergy of certain combinations of data points can prove a more significant threat to a user 90 which may not be initially realized by the user 90 when observing the data individually. For example, a data broker 90 in possession of both credit card information, bank account information, or the like, as well as a mother's maiden name, historical physical addresses for the user, or similar data points used for security measures can provide a relatively high threat score. As such, the data broker logic 130 can process all this information, extract feature vectors and assign weightings to determine a threat score for the data broker 90. As will be appreciated these are simplified examples used for illustrative purposes.

Advantageously, the system 100 can search out data brokers 80 that may not be readily available to the user 90, or data brokers 80 that the user 90 is unaware possesses any information on them. For example, data brokers 80 that have little to no online or physical presence and may operate as a business to business, or through one or more shell companies, or the like. This may be intentional on the part of the data broker 80 in order to disguise that they are trading PII on the user 90. As such, the user 90 would be unaware of their presence in order to search from them or directly request removal of PII.

In an embodiment, the data broker logic 130 can then provide a data broker profile interface ("profile interface") 312 (e.g. FIG. 7) configured to present a list of one or more data broker profiles 318. A data broker profile 318 can represent a specific data broker 80, or a data point (e.g. an account, a social security number, an address, etc.) about the user 90 which the data broker 80 is in possession of. The data broker profiles 318 can be presented in an order of threat level, e.g. a descending order of threat level. Optionally, the user 90 can modify the order that the data broker profiles 318 are presented based on various filters, e.g. by a sort action button 326. The various filters can include, but not limited to, threat level, amount of PII, type of PII, age of the PII (i.e. how long the PII has been in possession with the data broker 80), if the data broker is selling the PII of the user 90, if the data broker is sharing the PII of the user 90, a user experience rating for the data broker 80 as determined by the rating logic 170, or the like. It is important to note that the company names, firms, logos, and/or websites shown in any of FIGS. 1-13 are only used for exemplary purposes.

In an embodiment, the data broker profile 318 can provide additional information about the data broker 80, the PII profile 122 information in their possession, and what the data broker 80 is doing with the PII profile 122 information. For example, certain data broker(s) 80 such as marketing companies, spyware websites, or the like, can be more actively circulating the PII for the user 90. Alternatively, the data broker 80 can be in possession more sensitive PII (i.e. different types of PII), such as a social security number or credit card information, relative to less sensitive information such as a name or a physical address. As such, the weightings applied to such data brokers 80 can provide a high threat level score, and the associated data broker profiles 318 can be presented first, in order to be dealt with sooner. By contrast, where the data brokers(s) 80 possess less sensitive PII or share little or no PII (e.g. the user's 90 bank), the associated data broker profile 318 can be provided a relatively low threat level score and listed towards the bottom.

Figure 8:
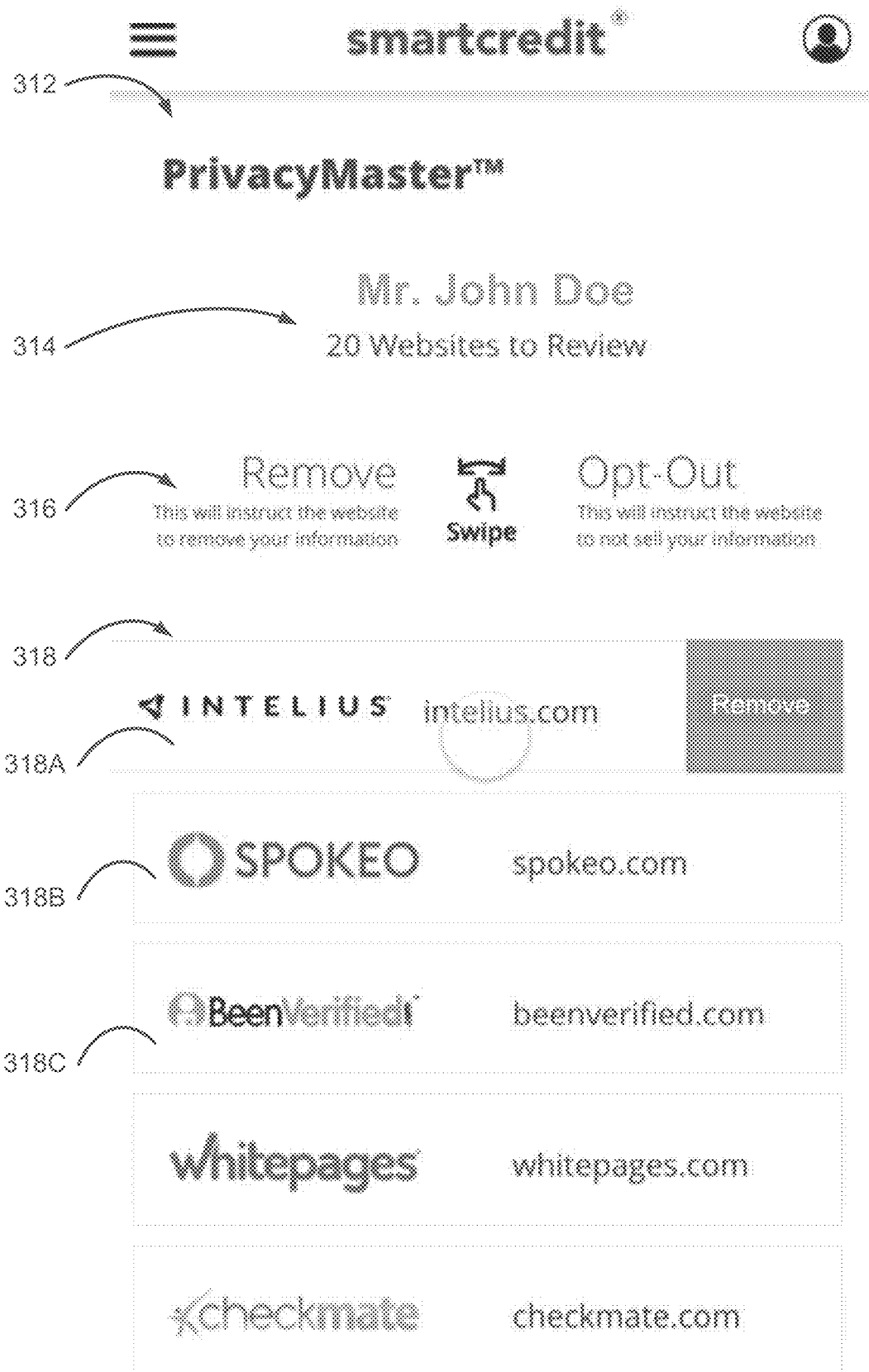

In an embodiment, as shown in FIGS. 8-11, the profile interface 312 can be configured to receive an input from the user 90. For example, the user 90 can use a touch sensitive screen to "swipe" the data broker profile 318 to a first side, e.g. a right side, to "Opt-Out" (FIG. 10) and can swipe to a second side, opposite the first side, e.g. to a left side, to "Remove" (FIG. 8). As used herein "Opt-Out" can include the system 100 sending a request to the data broker 80 on behalf of the user 90, to request to not to share or sell the PII of the user 90 with another third party. As used herein "Remove" can include the system 100 sending a request to the data broker 80 on behalf of the user 90, to request to delete all PII associated with the user 90 and not to share the PII of the user 90 with another third party. In an embodiment, the user 90 can request additional information on the PII that the data broker 80 is in possession of or additional information on how the data broker 80 is using the PII. It will be appreciated that other forms of user input such as selection boxes, buttons, hand gestures, or the like, are contemplated to fall within the scope of the present invention. Further, it will be appreciated that other types of input, actions, or requests to send to the data broker 80, are also contemplated.

Advantageously, the system 100 can provide "Opt-Out" or "Remove" requests to the data broker(s) 80 on behalf of the user 80 without disclosing any additional PII to the data broker 80 in the process. This prevents the data broker 80 from complying with the request to "Opt-Out" or "Remove" of a first grouping of PII about the user 90, while preventing the data broker 80 from gleaning a second grouping of PII about the user 90, different from the first grouping of PII. For example, a data broker 80 can possess a social media handle for the user 90. If the user 90 reaches out directly to the data broker 80 requesting the data broker 80 to delete the social media handle, the data broker 80 can seemingly comply with the request while gleaning additional PII, i.e. the name of the person, a phone number, e-mail address, or the like. Further, the system 100 can send requests to a data broker 80 on behalf of one or more users 90 of the system. As such, by sending multiple requests with regards multiple data points and/or multiple users 90 can further obfuscate which PII is associated with a specific user 90.

Figure 9:
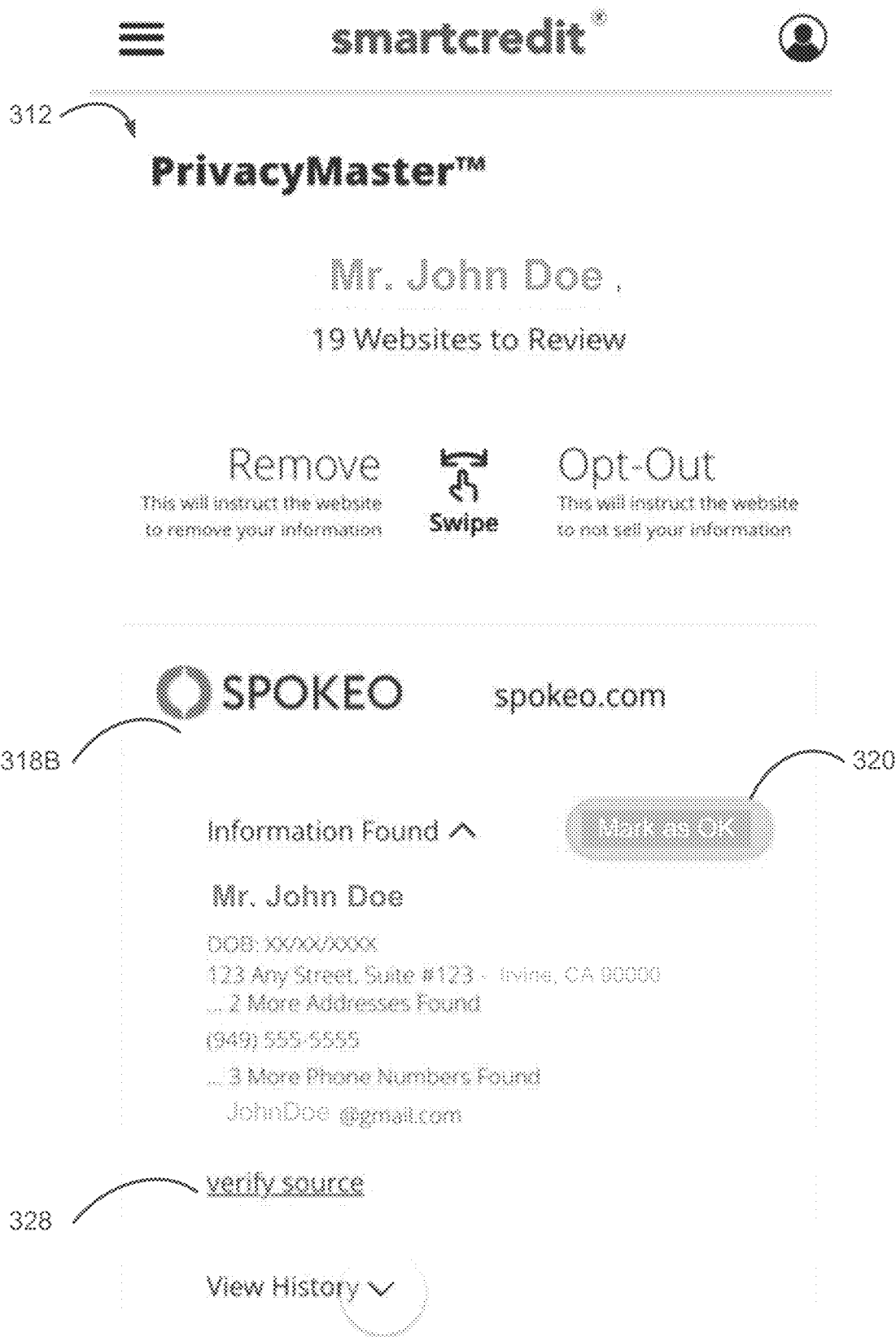

In an embodiment, as shown in FIG. 9, the data broker logic 130 can further provide a "Mark as OK" check box 320 configured to mark the data broker profile 318, and the associated data broker 80 and/or data point, as "OK" to possess the PII, or the user 90 has deemed the PII as not being misused. Marking the data broker profile 318 as "OK" can remove the data broker profile 318 from the profile interface 312. In an embodiment, the data broker profile 318 can be removed from the profile interface 312 indefinitely. In an embodiment, the data broker profile 318 can be removed from the profile interface 312 for a predetermined length of time. In an embodiment, the data broker profile 318 can be removed from the profile interface 312 until an action is detected by the system 100, for example a change in the type or amount of PII possessed by the data broker 80, or a change in how the data broker 80 is using the PII, (sharing, selling, etc.). In an embodiment, once the user 90 has provided an "Opt-Out," "Remove," or "Marked as OK" input the data broker logic 130 can remove the data broker profile 318 from the profile interface 312.

In an embodiment, the profile interface 312 can be configured to allow a user to select one or more data broker profiles 318 and apply a response, (e.g. Remove, Opt-out, mark as OK) to all. Selecting one or more data broker profiles 318 can be by check boxes, buttons, a "select all" button, swiping, "dragging" to highlight a group of profiles 318, or the like. In an embodiment, the data broker profiles 318 can be sub-grouped based one or more categories such as the industry that the data broker 80 is in (e.g. Financial, Medical, Real Estate, etc.), the type of PII (e.g. Personal, Financial, Medical, etc.) in possession by the data broker 80, the rating applied to the data broker profile 318 by the rating logic 170 (e.g. 4 stars and above), or the like. The user 90 can then apply a single response, (e.g. Remove, Opt-out, mark as OK) to all data broker profiles 318 within the sub-grouping(s).

Compliance

Figure 12:
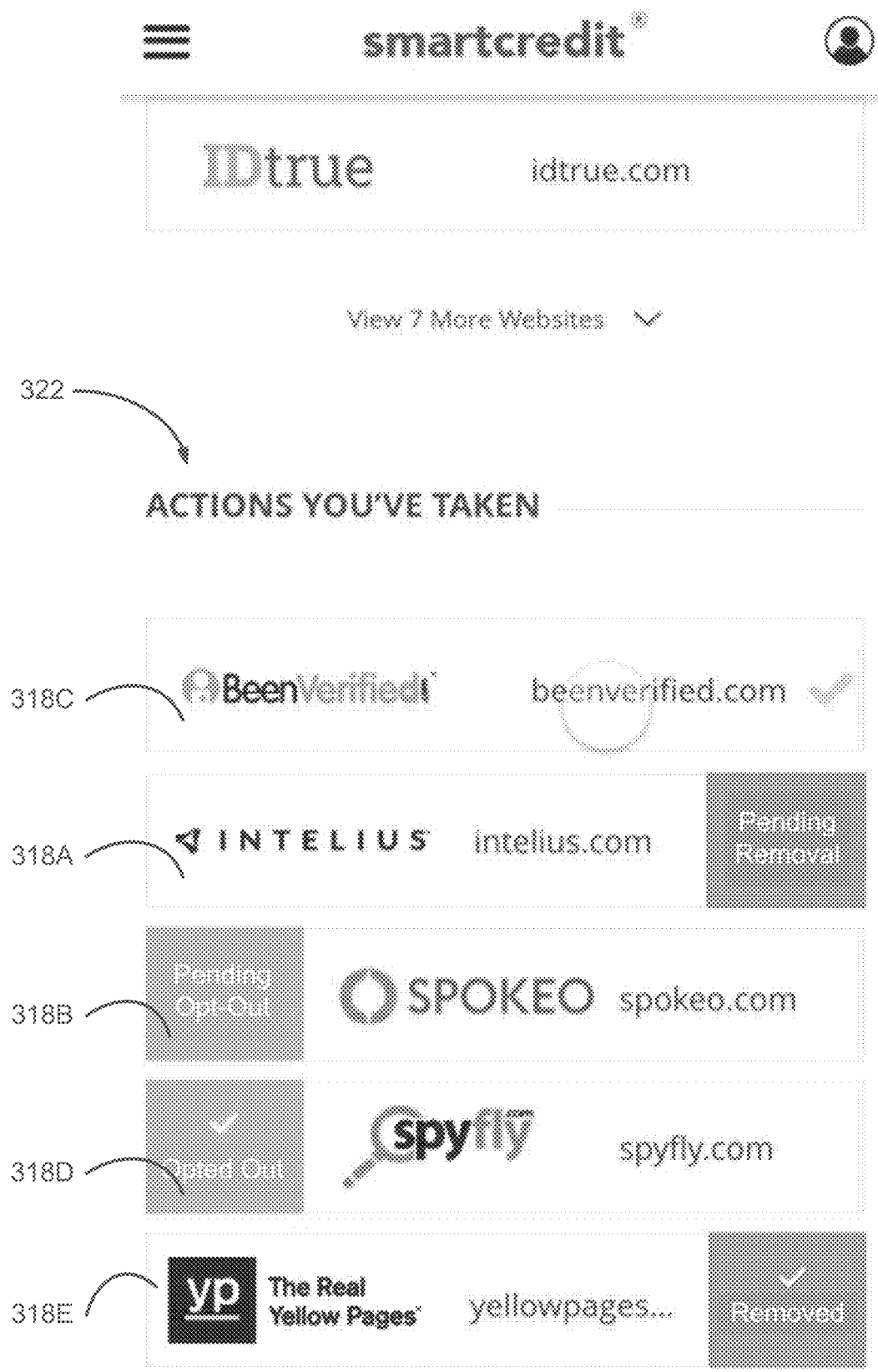
FIG. 12 illustrates an exemplary screenshot of compliance interface, in accordance with embodiments disclosed herein.
Figure 13:
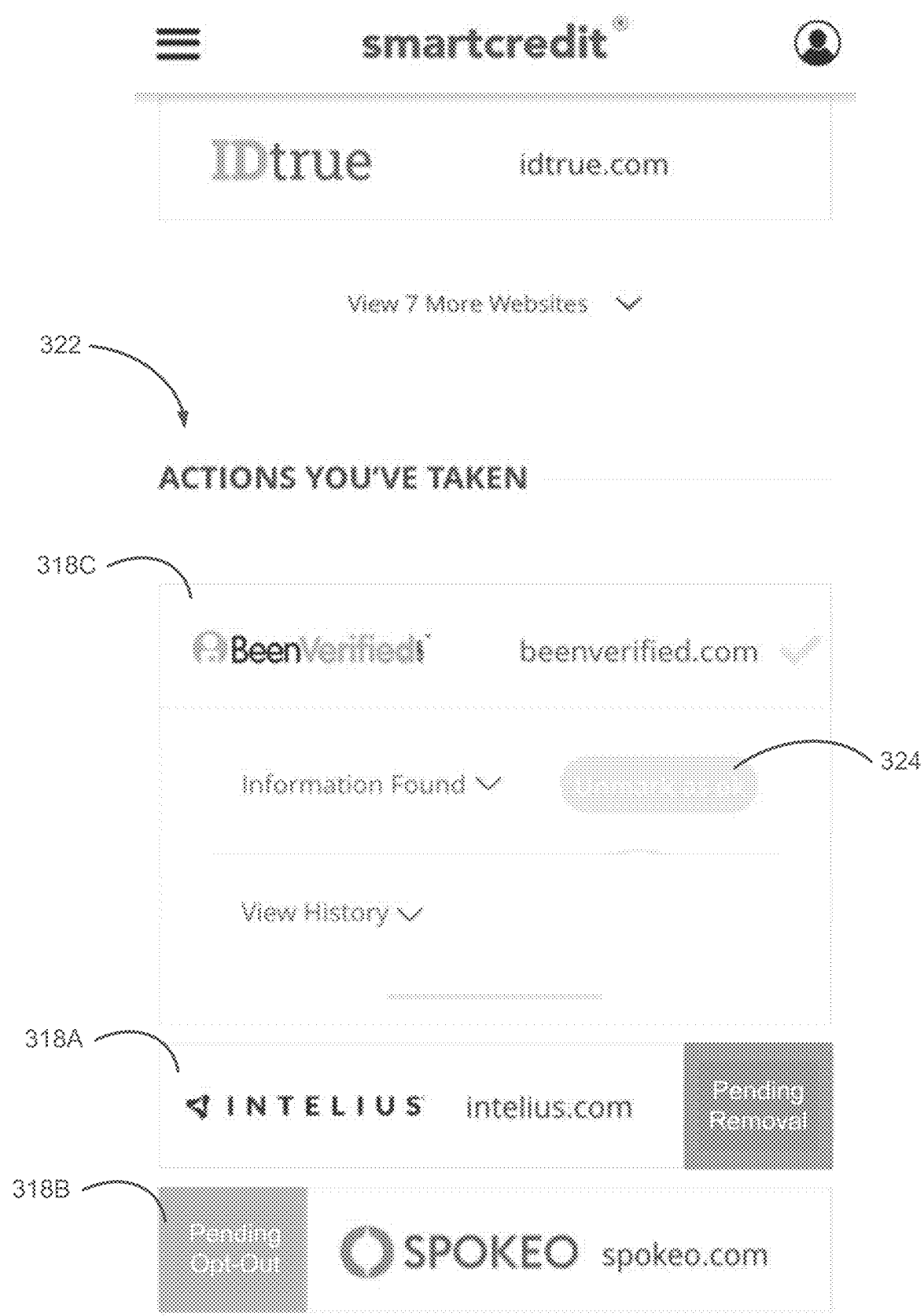
FIG. 13 illustrates an exemplary screenshot of compliance interface receiving one or more inputs, in accordance with embodiments disclosed herein.

In an embodiment, the compliance logic 140 as will be discussed in more detail herein, may include logic configured to perform functions to monitor one or more data broker(s) 80 for compliance with the requests ("Opt-Out," "Remove," etc.) sent by the system 100. In an embodiment, the compliance logic 140 can provide a compliance score for the data broker 80. In an embodiment, as shown in FIG. 12, the compliance logic 140 can provide a compliance interface 322 of data broker profiles 318 including the requests sent. The data broker profiles 318 can include additional information about the data broker 80 or the PII possessed by the data broker 80, as described herein. The compliance logic 140 can monitor data broker(s) 80 for compliance with the request. The compliance logic 140 can determine compliance with the request and update the data broker profile 318 on the compliance interface 322, (e.g. "Actions you've taken" user interface) to inform the user 90 that the request has been complied with.

In an embodiment, the compliance logic 140 can send a notification or an alert (e.g. e-mail, text message, pop-up notification within a user interface) to inform the user 90 if the data broker 80 has, or has not, complied with the request. In an embodiment, the compliance logic 140 can determine if the data broker 80 has not complied with the request, for example within a predetermined time window. The compliance logic 140 can resend the request, notify the user 90, or return the data broker 80 to the profile interface 312. Advantageously, the system 100 can allow a user 90 to easily reengage with the data broker 80 after a request (e.g. remove or opt-out) has been complied with.

In an embodiment, the compliance logic 140 can determine a compliance score based on a data broker's 80 compliance or non-compliance to a request within a predetermined time window, or in response to an action by the data broker 80, or the user 90. In an embodiment, the compliance logic 140 can analyze one or more of i) a time elapsed between a request to delete the PII is sent to the data broker 80, and the PII being deleted by the data broker 80, and ii) a time elapsed between a request not to share or to sell the PII is sent to the data broker 80 and the data broker 80 sharing or selling the PII, for the user 90 and/or one or more second users 91 of the system 100. In an embodiment, an amount of time elapsed for either of deleting or sharing the PII in response to the request can vary and can be used to predict a threat level to a first user. In an embodiment, the compliance logic 140 can use machine learning schema that is trained by historical data from compliance scores from one or more second users 91 of the system and the data broker 80 to extract key features in determining a compliance score and as to a corresponding threat level to the user 90.

For example, a short amount of time between a request to remove PII and the data broker 80 complying can indicate a high level of good faith on behalf of the data broker 80 and as such provide a relatively low threat score. Similarly, a larger amount of time elapsed between a request to remove PII and the data broker 80 complying, or the data broker 80 not complying at all either expressly or implicitly, can provide a relatively high threat score. For example, a time elapsed between a request not to share the PII, and the data broker 80 sharing PII can also indicate a varying lack of good faith and as such an increased threat level to the first user. The time scales used in the analysis of the compliance score may also be pertinent as time scales over a matter of seconds, minutes, hours, days, weeks, months, or years may all have varying indications of good faith on behalf of the data broker 80 and thereby affect the associated threat scores. For example, varying time scales can indicate either a show of good faith from the data broker 80 and thereby lower threat scores, a lack of good faith from the data broker 80 and thereby higher threat scores, or can indicate an unintentional non-compliance with a request. Trends in such times scales in responses to requests can be used to further modify the threat scores for data broker 80. For example data brokers 80 that comply quickly and do not resume sharing can provide low threat scores. However, data brokers 80 that show trends of complying with a request and then resuming sharing PII after some time has elapsed (months, years) are provided high threat scores. As will be appreciated these are simplified examples that are provided for illustrative purposes.

As such, the compliance logic 140 can determine a compliance score for a data broker 80 based on their compliance, or non-compliance with one or more requests from one or more users 90 or second users 91 of the system 100. In an embodiment, data broker logic 130 can retrieve a compliance score from the compliance logic 140 to further analyze and predict a threat level for a data broker 80 to the user 90. For example, the data broker logic 130 can determine a threat level to a first user for a data broker 80, by processing a compliance score for the data broker 80 using machine learning schema that is trained in part using compliance scores from one or more second users 91, wherein compliance scores are determined using one or more of i) a time elapsed between a request to delete the PII is sent to the data broker 80, and the PII being deleted by the data broker 80, and ii) a time elapsed between a request not to share or to sell the PII is sent to the data broker 80 and the data broker 80 sharing or selling the PII. Worded differently, the system 100 can monitor how a data broker 80 responds to requests from one or more second users 91 and use this to determine a threat level to the first user 90.

Data Broker Petition

In an embodiment, the petition logic 160 as will be discussed in more detail herein, may include logic configured to perform functions to provide an interface for the data broker 80 along with the request sent by the user. The request can include a request for more information, a request to "Opt Out," or a request to "Remove," or the like, as described herein. The data broker interface can include details on which particular PII in the data broker's possession is being referred to by the request. The interface can be configured to receive inputs from the data broker 80, to explain the type and amount of PII they are in possession of, for the particular user 90, how the data broker 80 obtained the PII on the user 90, and how the data broker 80 uses the PII of the user 90. Advantageously, these explanations can be provided back to the user 90 by way of the system 100 in order to maintain confidentiality of the user 90. Further the data broker interface can allow the data broker 80 to explain to the user 90 how they are in possession of the PII in a legitimate way, or how they use the PII to the benefit of the user 90.

In an embodiment, the data broker interface can provide one or more predetermined responses from the data broker 80 to the user 90. In an embodiment, the data broker interface can be configured to receive a response to one or more requests from the data broker 80. In an embodiment, the responses from the data broker 80 can petition the user 90 for continued use of the PII in their possession. In an embodiment, the data broker 80 can petition the user 90 for continued use of the PII in their possession within specified ways or within refined guidelines or parameters. For example, the data broker 80 can only share the PII with a limited number of third parties, or with specific third parties. In an embodiment, the responses from the data broker 80 can petition the user 90 for new or different PII. In an embodiment, the data broker response can provide an explanation of how the data broker 80 uses the PII to the advantage of the user 90 in a real world and/or online situation. These responses and petitions from the data broker 80 to the user 90 can further be used by the system 100 to determine a threat level for the data broker 80 to the user 90. For example, a data broker 80 that responds quickly and/or with informative responses can provide a lower threat level to the user 90.

Compensation/Surveys

In an embodiment, the data broker response can offer compensation to the user 90 for continued use of the PII, for specified, refined, or narrowed use of the PII, or for new or different PII. In an embodiment, the petition logic 160 can provide a survey from the data broker 80 to the user 90. The user 90 can be offered to take the survey to provide guidelines on how to use the PII that is in possession by the data broker 80. In an embodiment, the survey can allow the user 90 to provide different or additional PII. As such, the user 90 is able to control what PII is held by the data broker 90, i.e. remove the PII that the user 90 does not want shared, allow to data broker 80 to continue to use some of the PII, or provide the data broker 80 with PII that the user 90 prefers to share, or the like.

In an embodiment, the survey can be provided to the system 100 by the data broker 80 to be provided in turn to the user 90 and thereby maintaining the anonymity of the user 90. In an embodiment, the survey can be predetermined by the system 100, i.e. one or more survey templates and provided to the data broker 80 by way of the data broker interface. The data broker 80 can then select one or more surveys for the system 100 to provide to the user 90. Optionally the data broker 90 can further modify the survey template.

In an embodiment, the data broker 80 can provide compensation to the user 90, by way of the system 100, in return for responding to the survey. The compensation can include monetary gifts, gift cards, discounts, products or services from one or more third parties. Advantageously, the compensation can motivate the user 90 to complete the survey or provide guidance to the data broker 80 for further use of the PII.

In an embodiment, the petition logic 160 can provide a predefined response set to the user 90 that can be provided in response to the survey. For example, where the data broker 90 provides a predefined survey or a survey that includes one or more standard questions, the system 100 can provide a response set from the user 90 which will provide responses to the predefined survey or the standard question(s). The petition logic 160 can provide the user 90 with an initial response set for the user 90 to fill out or respond to. Alternatively, the petition logic 160 can request to save the answers from a previous survey provided to the user 90. The petition logic 160 can save the answers as one or more response sets and provide the one or more response sets to the data broker 80 in response to a survey.

By way of non-limiting examples, a response set can include to provide a first and last name in response to a standard question of "what is your name?" on a survey. A response set can include to provide P.O. Box address in response to a standard question of "what is your physical address?" on a survey. A response set can include a standard answer to one or more questions on a survey that are directed to a particular group of data, for example the user 90 can request a standard "Remove" response to all questions or surveys directed to "Medical information." As described in more detail herein, a data broker 80 can be provided a rating by the rating logic 170. As such, a user 90 can provide a first response set (e.g. "provide name, address, Remove all Medical, Opt out all Financial") for data broker(s) 80 that have a first rating (e.g. 5 stars) and a second response set (e.g. "Remove All") for data brokers that have a second rating (e.g. 3 stars or less), different from the first rating. As will be appreciated, these are simplified examples provided for illustrative purposes and not intended to be limiting in any way. Data brokers 80 that provide compensation and/or response surveys can further be used by the system 100 to determine a threat level for the data broker 80 to the user 90. For example, a data broker 80 that responds frequently or quickly with compensation or surveys can provide a lower threat level to the user 90, and can motivate co-operation between the data broker 80 and user 90.

Rating Logic

In an embodiment, the rating logic 170 as will be discussed in more detail herein, may include logic configured to perform functions to provide a rating interface to the user 90. The rating interface can allow a user to rate the data broker 80 based on their experience with the data broker 90 through the system 100 to provide a user experience rating. The user 90 can provide a quantitative or qualitative user experience rating using alphanumerical symbols, images, icons, emoji's, or the like, e.g. a score out of 10, a number of stars, thumbs up or thumbs down, etc. Further, the rating logic 170 can be configured to receive a review input from the user 90 about the data broker 80 to allow a user 90 to provide a written review of their experience with the data broker 80. The user experience ratings and reviews about the data broker 80 can be provided to other (second) users 91 of the system 100, (i.e. different from the first user 90), or can be provided to other non-users 93 of the system 100, (i.e. users, different from the first user 90, and who have not provided an initial PII to sign up to the system 100, or are defined as outside of the system 100 ecosystem). Advantageously, the rating logic 170 can allow the user 90 to leave a positive or a negative review of their experiences with the data broker 90 to motivate the data broker 80 to comply with the requests, and use the PII of the user 90 in a way that would be advantageous to the user 90, as explained in the data broker response to the request. Further, the system 100 can further user these user experience ratings and reviews to modify a threat level of the data broker 80 to the user 90

Relation Links

In an embodiment, the PII logic 120 can establish links between the user profile 122 of the first user 90 and a user profile 122B for one of a second user 91 of the system, or a non-user 93. As used herein a second user 91 can be a user of the system 100 who is different from the first user 90. As used herein, a non-user 93 of the system 100 can be different from the first user 90 and who have not provided an initial PII to sign up to the system 100, activated a fraud insurance (see FIGS. 3-6), or are otherwise defined as outside of the system 100 ecosystem. As such, non-users 93 of the system 100 may be able to view or interact with some features or information of the system 100 (e.g. view a rating of the data broker 80), but may otherwise be limited or restricted from certain features of the system 100, relative to one or both of the first user 90 and the second user 91.

In an embodiment, the PII logic 120 can establish a user profile for a non-user 93 by retrieving and storing additional PII about the non-user 93 from one or more third party data stores 60.

In an embodiment, the PII logic 120 can establish a link between a first user profile 122 for a first user 90 and a second user profile, e.g. second user profile 122B for one of the second user 91 or a non-user 93.

In an embodiment, the PII logic 120 can provide a user interface configured to allow the first user 90 to search for a user profile 122 for one of a second user 91 or a non-user 93. In an embodiment, the PII logic 120 can provide a user interface configured to provide the first user 90 with one or more user profiles 122 for one of a second user 91 or a non-user 93 that may be linked to the first user. In an embodiment, the PII logic 120 can establish a link and optionally send a request to the second user 91 to allow the link to be established.

In an embodiment, the PII logic 120 can be configured to receive an input from the user 90 to categorize the link based on the nature of the relationship between first user 90 and the second user 91. Exemplary link categories can include family, friend, wife, child, sibling, work colleague, etc. Where a non-user 93 subsequently signs up to join the system 100 and thereby transitions to become a second user 91, the system 100 can provide a list of links already established to confirm the links, e.g. as part of the sign up process.

In an embodiment, the system 100 can provide a profile interface 312 for a particular group or sub-group of relation-linked user profiles, e.g. user profile 122B. The first user 90 can then review data broker profiles 318, send responses ("Remove," "Opt-out" etc.) or bulk responses, established response sets to surveys, or the like, as described herein on behalf of the second user 91 or on behalf of a non-user of the system 93. Further, the system 100 can request permission from the second user 91 or the non-user of the system 93 (e.g. sending an e-mail) before allowing the first user 90 to access these features.

For example, where a first user 90 can sign up to the system 100, as described herein, the first user 90 can establish a link with a user profile for a second user 91 of the system (e.g. a spouse) and can establish a link with a user profile for a non-user 93 of the system 100 (e.g. a child). Where the system 100 has confirmed the link by either confirmation requests sent to the second user 91 or non-user 93, or by additional information from a third party, the first user 90 can then send a "Removal" request for all or some PII for the non-user 93 (e.g. the child) or send an "Opt-out" request for all or some PII for the second user 91, or the like. As will be appreciated, these are simplified examples provided for exemplary purposes and not intended to be limiting in any way.

Method of Use

Figure 2A:
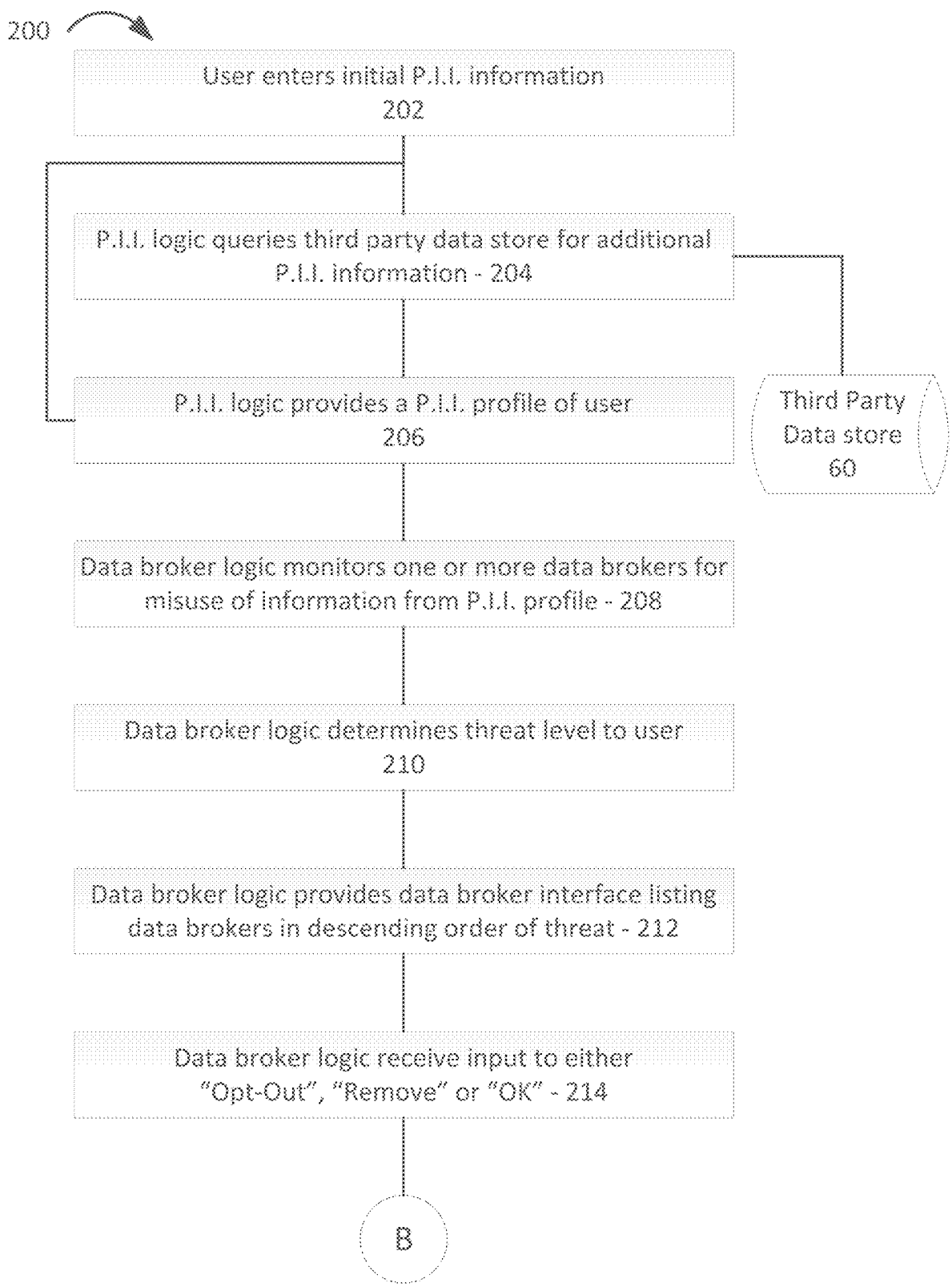
FIGS. 2A-2B illustrates a flow chart for an exemplary method of use, in accordance with embodiments disclosed herein.
Figure 2B:
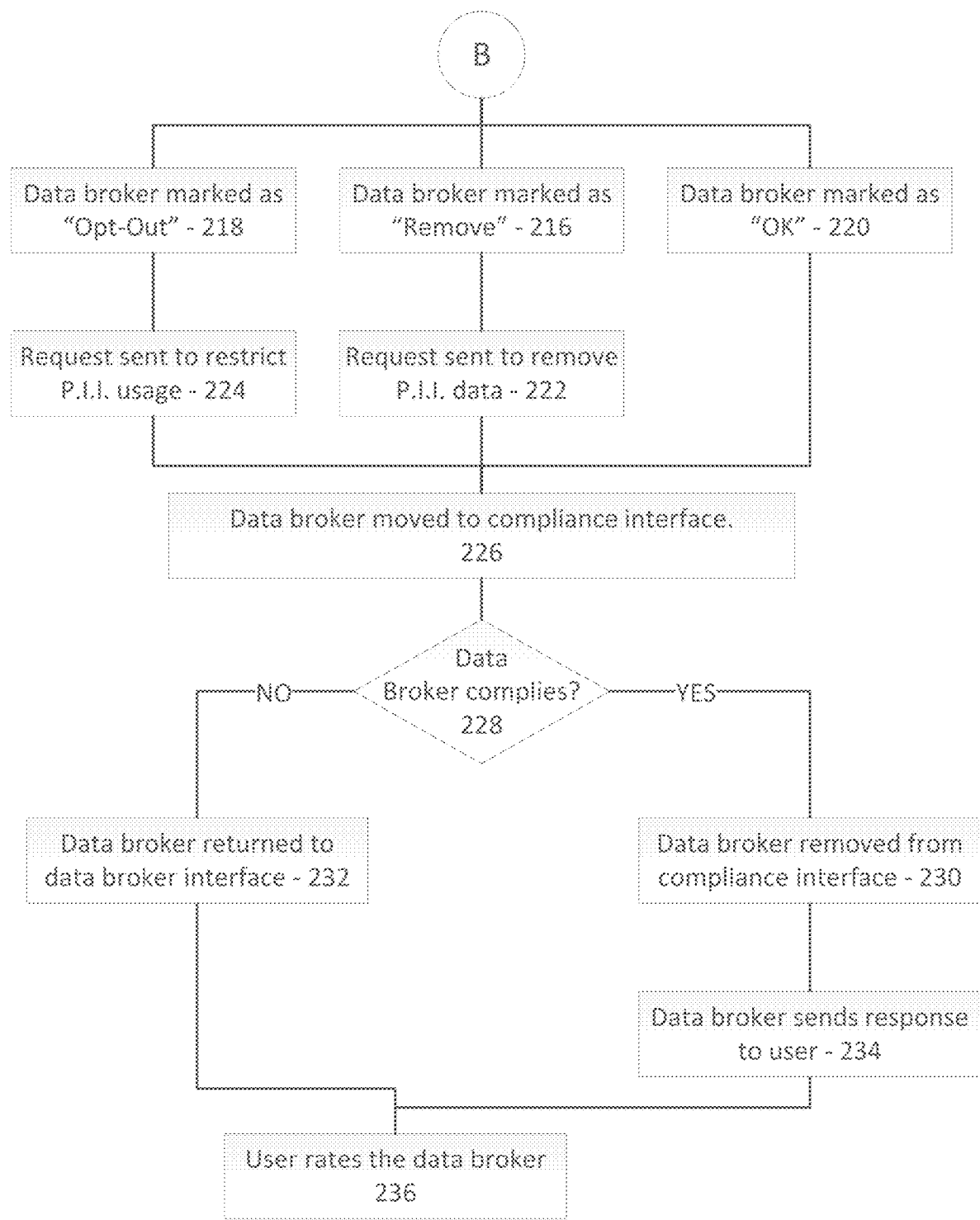
Figure 3:
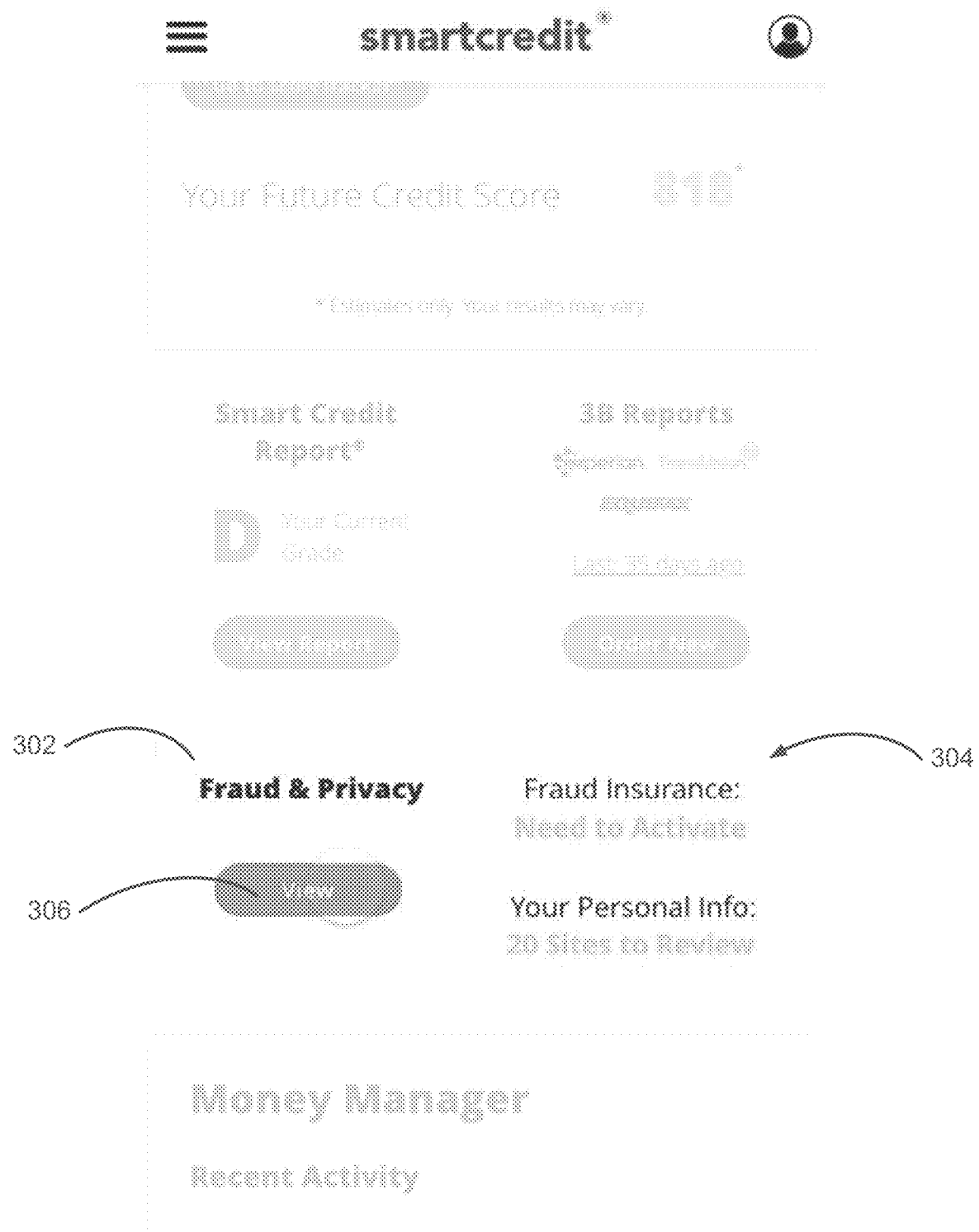
FIG. 3 illustrates an exemplary screenshot of accessing the system of FIG. 1, in accordance with embodiments disclosed herein.

FIGS. 2A-2B shows a flow chart for an exemplary method of use for the system 100. FIGS. 3-13 show exemplary screen shots for the system 100. As shown in box 202 of FIG. 2A, and in FIG. 3, the user 90 can subscribe to the system 100 and enter an initial PII, such as name, address, date of birth, social security number, or the like. In an embodiment, the user 90 can pay a subscription fee or one-time access fee. Optionally, the system 100 may be included as part of a broader system that the user 90 has already signed up to and provided an initial PII, and/or paid a subscription fee or one-time access fee. Exemplary broader systems can include a credit score system, further details and embodiments of which can be found in U.S. Pat. No. 11,232,489 and U.S. Patent Publication 2020/0074546, which are each incorporated by reference in its entirety.

In an embodiment, the system 100 can provide an access interface 302 providing a summary of information 304, e.g. fraud insurance status, number of data brokers 80 requiring review, number of data brokers 80 deemed to be in possession of PII of the user 90, or the like. The access interface 302 can further include an access button 306 to initiate the system 100. In an embodiment, as shown in FIGS. 4-6, the system 100 can request activation of an identity theft coverage insurance 308 prior to activation of the system 100. In an embodiment, the system 100 can require activation of the identity theft insurance 308 prior to activating the system 100. Optionally, the system 100 can skip the ID theft insurance step by selecting "Not Now" 310. In an embodiment, the user interfaces shown in FIGS. 3-6 can be provided by the user interface logic 110.

In an embodiment, the user interface logic 110 can provide a dynamically updatable interface to the user 90 to enter one or more personally identifiable information ("PII") details, e.g., name, email address, social security number (S.S.N.), or the like, that can be stored to the data store 108 (box 202). In an embodiment, as shown in box 204, the PII logic 120 can query additional databases, remote databases, e.g. third party data stores 60, or the like to retrieve additional PII for the user 90 to provide a user PII profile 122 (box 206). In an embodiment, the user interface logic 110 can provide a PII profile interface to the user 90 configured to allow the user 90 to review the information included in the PII profile for accuracy or update incorrect information.

In an embodiment, as shown in box 208, the data broker logic 130 can then retrieve information from the user PII profile 122 and compare the information from one or more data brokers 80 for misuse of user PII. In an embodiment, as shown in box 210, the data broker logic 130 can then determine a threat level for the data broker(s) 80 based on predetermined rules and weightings, or machine learning or similar AI schema, as described herein. The threat level can be based on the amount or type of PII the data broker possesses, the amount of sharing of the PII data that the data broker performs, the amount of selling of the PII, or the like.

Figure 7:
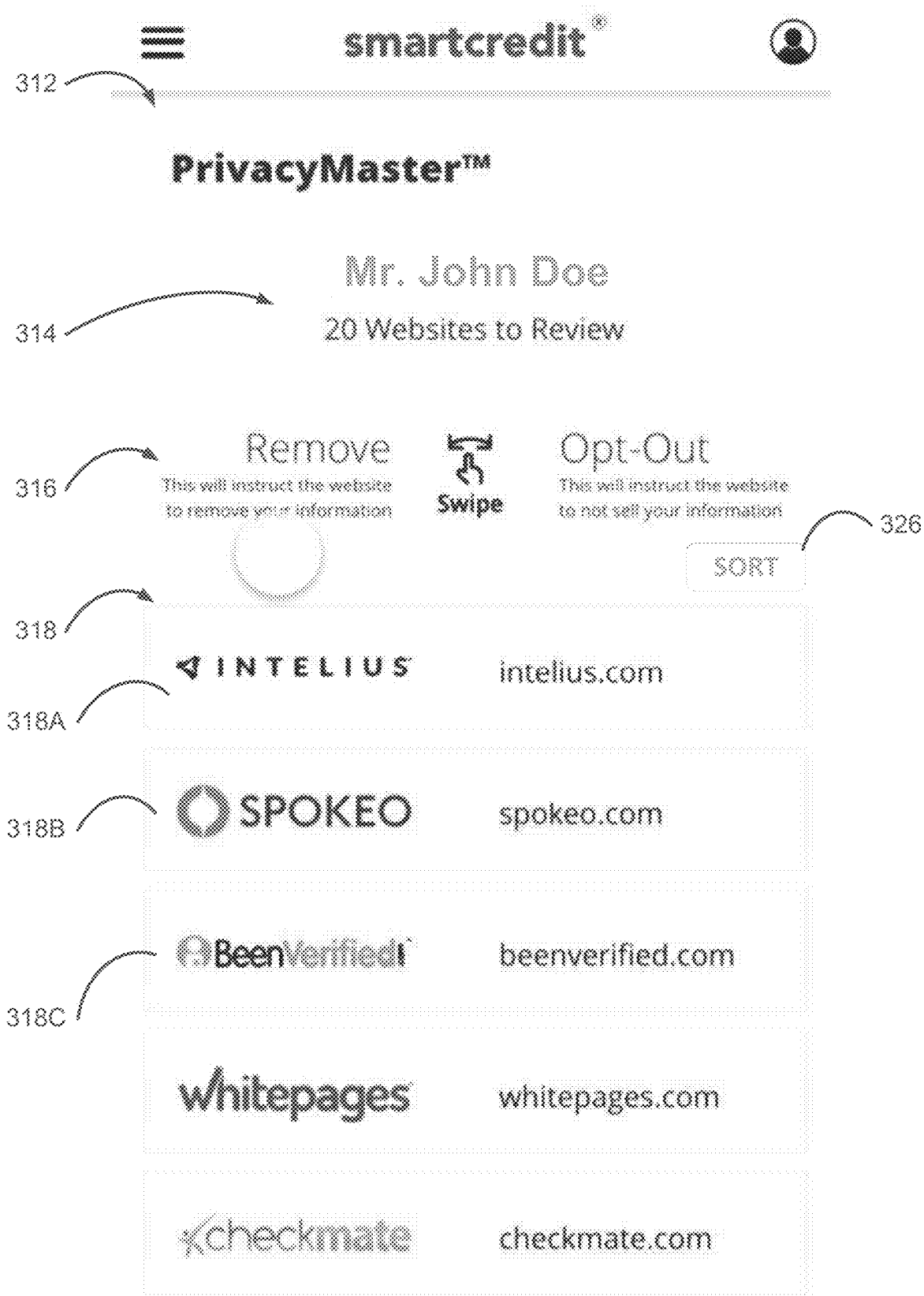
FIG. 7 illustrates an exemplary screenshot of a user interface showing one or more data broker profiles, in accordance with embodiments disclosed herein.

In an embodiment, as shown in box 212 and FIG. 7, the data broker logic 130 can then provide a profile interface 312, listing the data broker(s) 80 in a descending order of threat. In an embodiment, summary information of the profile interface 312 can be provided as part of the summary information 304 as part of the access interface 302. FIG. 7 shows an exemplary screen-shot of a profile interface 312. The profile interface 312 can include summary information 314 including the name of the user 90 and/or a summary of data broker(s) 80 included in the profile interface 312, such as a total number, groupings, or the like. In an embodiment, the profile interface 312 can include instructions 316 for how to operate the profile interface 312 or similar information.

In an embodiment, the profile interface 312 can include one or more data broker profiles 318, each including information about a data broker 80 that the data broker logic 130 has determined is in possession of information from the user PII profile 122. Each data broker profile 318 can include information about the data broker 80, e.g. name, logo, website address, or the like, or can include a summary of PII about the user 90 that may be being misused by the data broker 80. In an embodiment, the data broker profile 318 can further include a threat level score, either provided as a quantitative alphanumerical score, or as a qualitative grouping indicated by a color or symbol, or the like.

In an embodiment, the profile interface 312 can be configured to present the data broker profiles 318 in a way that can indicate the greatest level of threat to the user 90 and can allow the user 90 to quickly identify data brokers 90 that possess PII and which pose the greatest threat to the user 90.

In an embodiment, as shown in FIG. 8, the profile interface 312 can provide the data broker profiles 318 as a list in descending order of threat level. However, it will be appreciated that the profile interface 312 can include various dynamically updatable graphical interfaces. As a non-limiting example, each data profile 318 can be provided as a bubble, where a size or position of the bubble indicates to the user an order with which to action the data broker profile.

Further, the data broker logic 130 can be configured to receive an input, e.g. a "swipe interface," to allow the user 90 to action each data broker profile 318 (box 214). For example, as shown in FIG. 8, the first data broker profile 318A can be swiped in a first direction, e.g. a left direction, to cause a "Remove" action (box 216). As used herein the "Remove" action can include sending a request to the data broker 80 detailed in the first data broker profile 318A requesting that the PII data, belonging to the user 90, be deleted from the data broker system and not shared or sold with any other third party (box 222). The first data broker profile 318A can then be moved to the compliance interface 322 (box 226; FIG. 12).

Figure 10:
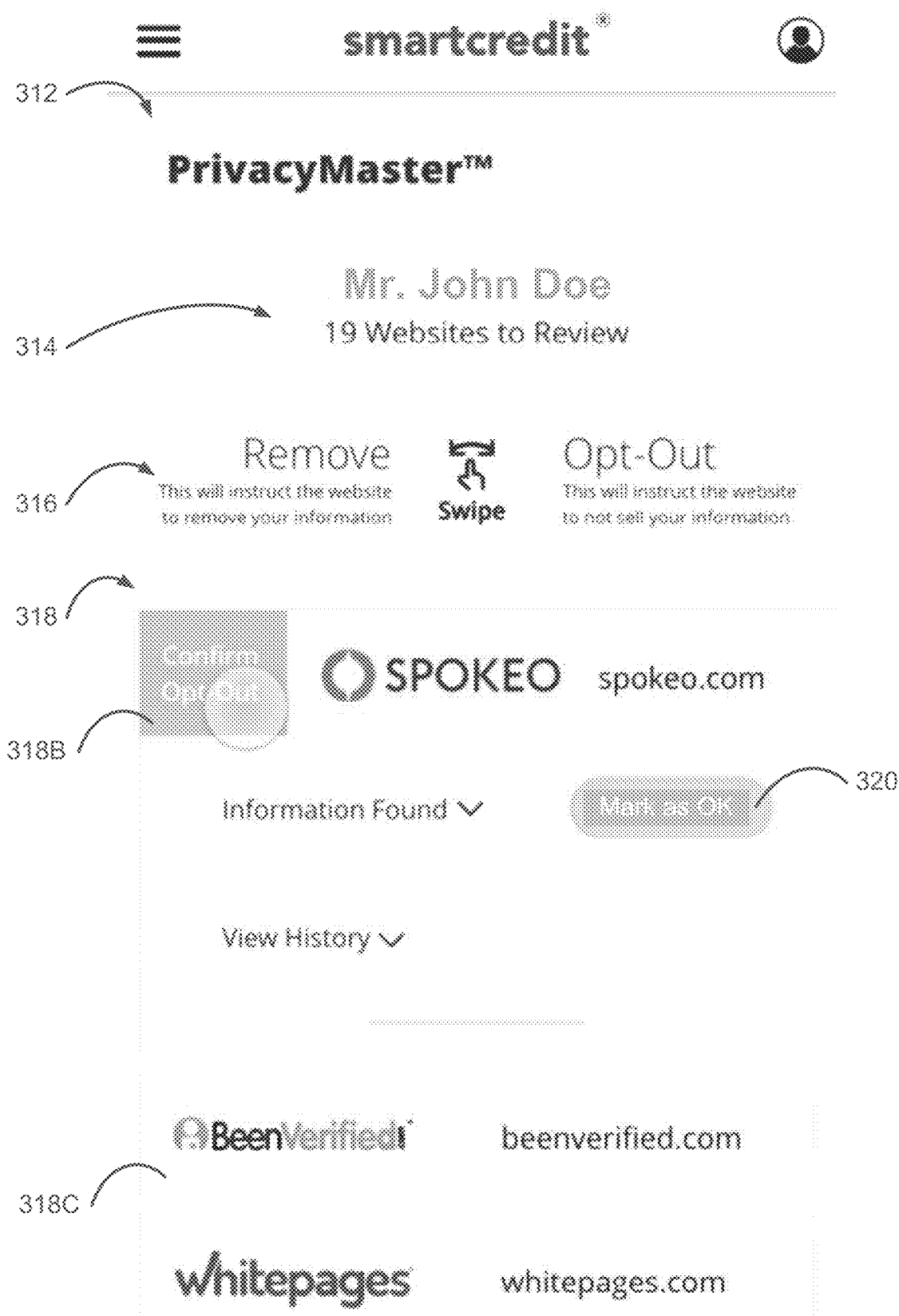

As shown in FIG. 10, a second data broker profile 318B can be swiped in a second direction opposite the first direction, e.g. a right direction, to cause a "Opt Out" action (box 218). As used herein, the "Opt Out" action can include sending a request to the data broker 80 detailed in the second data broker profile 318B, requesting that the PII data, belonging to the user 90, not be shared or sold with any other third party, but that the PII data does not have to be deleted from the data broker system (box 224). The second data broker profile 318B can then be moved to the compliance interface 322 (box 226; FIG. 12).

In an embodiment, as shown in FIGS. 9-10, a data broker logic 130 can be configured to allow a user to select a particular data broker profile from the list 318 and access additional information about the data broker 80, for example, the type or amount of PII about the user 90, found in possession of the data broker 80, or viewing a history or timeline of how the data broker came into possession of the PII of the user 90 and what the data broker 80 has done with the PII since. In an embodiment, the data broker profile 318 can provide a "verify source" option 328. Selecting the "verify source" option 328 can indicate where the data broker obtained the PII from and if the user 90 provided consent from the user 90 to obtain the PII.

As shown in FIGS. 9-11, in an embodiment, the data broker logic 130 can be configured to provide a selection box, or button 320, such as a "Mark As OK" button 320, configured to indicate that the PII in possession by the data broker 80 is acceptable (box 220). When the "Mark as OK" button 320 is actioned the data profile, e.g. the third data profile 318C, can be removed from the profile interface 312 and/or moved to a compliance interface 322, e.g. an "Actions Taken" list (box 226).

In an embodiment, as shown in FIG. 12, the compliance logic 140 can provide a compliance interface 322, or "Actions Taken" list, including a list of data broker profiles 318 that have been actioned. For example, the first data broker profile 318A can include a "Pending Removal" indicator to show that a request to remove the PII data has been sent to the data broker 80 and that the system is awaiting a response (box 228). The second data broker profile 318B can include a "Pending Opt-Out" indicator to shown that a request to prevent the data broker 80 from sharing any PII data belonging to the user 90, has been sent to the data broker 80 and that the system 100 is awaiting a response (box 228). The third data broker profile 318C can include a check mark symbol, to indicate that the user 90 has selected the "Marked As OK" button 320 to indicate the PII in possession but the data broker 80 is acceptable.

In an embodiment, as shown in FIG. 12, a fourth data broker profile 318D, can include an "Opted Out" indicator to show that a response to the "Opt-Out" request has been received and complied with. In an embodiment, a fifth data broker profile 318E, can include an "Removed" indicator to show that a response to the "Remove" request has been received and complied with. Optionally, the data broker profiles 318D, 318E can be removed from the compliance interface 322 (box 230).

In an embodiment, selecting the data profile 318 can provide additional information about the data broker 80, as described herein. Further, for data profiles where the "Mark as OK" button 320 has been checked, the data broker profile can provide an "Unmark as OK" button 324. Actuating the "Unmark as OK" button 324 can return the data broker profile to the profile interface 312. In an embodiment, the system 100 can receive a non-compliance response, or not receive a response to the request within a predetermined time window. As such, the system 100 can return the data broker profile to the profile interface 312 (box 232).

In an embodiment, the petition logic 160 can provide a data broker interface configured to receive a response from the data broker for the user 90 (box 234). The data broker response can provide an explanation of the type and amount of PII they are in possession of, how the data broker obtained the PII, and how the data broker uses the PII of the user 90. In an embodiment, the system 100 can receive responses from the data broker 80, for the user 90, for continued use of the PII in their possession and/or within specified, refined, narrowed ways, or to request new or different PII data. In an embodiment, the data broker 80 can provide an explanation of advantages to the user 90 in a real world and/or online situation. In an embodiment the data broker 80 can offer compensation to the user for continued use of the PII, for specified, refined, or narrowed use of the PII, or for new or different PII.

In an embodiment, the data broker 80 can comply with the request to either "Opt Out" or "Remove." Once the request has been complied with the data broker 80 can reengage with the user 90 by way of the system 100 using the data broker response interface. Optionally the system 100 can provide an option to the data broker 80 to reengage with the user 90 after a predetermined amount of time has elapsed. The data broker 80 can petition the user 90 for continued use of the user PII in their possession and/or within specified, refined, narrowed ways, or to request new or different PII data. In an embodiment, the data broker 80 can provide an explanation of advantages to the user 90 in a real world and/or online situation. In an embodiment the data broker 80 can offer compensation to the user for continued use of the PII, for specified, refined, or narrowed use of the PII, or for new or different PII. Advantageously, the data broker delayed petition can provide a show of good faith from the data broker 80 to the user 90. Indicating they are willing to comply with the requests from the user 90, and as such petitioning to use PII from the user under predetermined conditions, and/or to the benefit of the user in real world or online situations.

In an embodiment, the rating logic 170 can be configured to allow a user to rate their experiences with the data broker 80 (box 236). The rating can be a quantitative or qualitative rating using alphanumerical symbols, images, icons, emoji's, or the like, e.g. a score out of 10, a number of stars, thumbs up or thumbs down, etc. The user 90 can provide a review of the data broker 80. The ratings and reviews 80 can be provided to other users of the system 100 or can be provided to other non-users of the system 100. Advantageously, the ratings and reviews can motivate the data broker 80 to comply with the request.

Advantageously, the system 100 can actively search for and provide a list of data brokers to review in a dynamically updatable interface, presenting the data brokers in order of a threat level to the user 90. With such a vast amount of data brokers and PII available, which may have been obtained through legitimate or non-legitimate means, it can be an overwhelming task for the user to track down, identify and contact the data brokers individually to prevent any further misuse of the users PII. This problem can be further exacerbated by data brokers intentionally operating with minimal online or physical presence to avoid being detected by the user. Further, the user can have little or no quantitative means of estimating a level of threat that each data broker poses to the user 90 such that the user 90 can effectively prioritize which data brokers require contacting immediately, compared with those that pose less of a threat. As such, the system 100 provides an improvement to the technological field to provide a system of quantifying the threat level posed to the user and presenting the data brokers in a dynamically updatable interface based on the threat level and actions to take, and actions taken.

Advantageously, the system 100 further allows the user 90 to send requests to a data broker 80 without disclosing any further PII. For example, if the user 90 were to contact the data broker directly and request removal of one or more PII, the user 90 would be unable to do so without disclosing additional PII to the data broker 80 that the data broker 80 may then further misuse. Often the additional PII disclosed can be more valuable to the data broker than the PII already in possession leading to a "bait and switch" situation that the user either succumbs to, or is unable to resolve the misuse of the initial PII. As such, the system 100 allows a user 90 to resolve misuse of PII while remaining protected. Further, the system 100 can send a request to a data broker 80 that includes the "Opt-Out" or "Removal" of PII from one or more users 90 of the system 100. As such, the data broker 80 would be unable to determine which user(s) 90 sent which requests further preventing the data broker 90 from gleaning additional PII and further protecting the individual user 90 from PII misuse.

While the invention has been described in terms of particular variations and illustrative figures, those of ordinary skill in the art will recognize that the invention is not limited to the variations or figures described. The features described with respect to one embodiment or variation may be used in other embodiments or variations. Processes described separately may be combined. In addition, where processes and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. Therefore, to the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

The invention claimed is:

1. A method of protecting personally identifiable information (PII), comprising:
   establishing a PII profile for a first user;
   monitoring one or more data brokers for PII that relates to the first user;
   determining a threat level to the first user for a data broker of the one or more data brokers by analyzing, using one or more predetermined rule sets and weightings or a machine learning schema, one or more of:
      a type or sensitivity of the PII of the first user possessed by the data broker,
      an amount of the PII of the first user possessed by the data broker, and
      an amount of the PII of the first user that is shared or sold by the data broker with a third party;
   rendering a dynamically updatable interface displaying one or more data broker profiles arranged in order of threat level to the first user; and
   responsive to receiving an input to the dynamically updatable interface, sending a request to the data broker or removing a first data broker profile from the dynamically updatable interface, wherein the dynamically updatable interface is provided on a touch sensitive screen and wherein receiving the input to the dynamically updatable interface includes swiping an aspect of the first data broker profile in a first direction or swiping the aspect of the first data broker profile in a second direction opposite the first direction.

2. The method according to claim 1, wherein establishing the PII profile includes requesting, from the first user, initial PII and querying a third party data store for additional PII about the first user.

3. The method according to claim 1, wherein monitoring one or more data brokers for PII that relates to the first user includes analyzing information retrieved from the one or more data brokers with information retrieved from the PII profile, and using one or more predetermined rule sets and weightings to determine an accuracy score for the information retrieved from the one or more data brokers, to predict whether the information from the one or more data brokers is related to the first user.

4. The method according to claim 3, further comprising:
   receiving additional input from the first user confirming or rejecting the information retrieved from the one or more data brokers as relating to the first user, and training the machine learning schema to iteratively improve the accuracy score.

5. The method according to claim 1, wherein determining the threat level to the first user further includes analyzing, using one or more predetermined rule sets and weightings, one or more of:
   an industry with which the data broker is associated,
   a user experience rating associated with the data broker as provided by one or more second users, or
   a compliance score determined by a response by the data broker to a request from the one or more second users.

6. The method according to claim 1, further comprising:
   processing the PII that is related to the first user from the data broker using a machine learning model that is trained using historical data from the data broker and one or more second users assign weightings to a set of features according to an input feature vector to determine a threat score corresponding to the data broker.

7. The method according to claim 1, wherein the first data broker profile of the one or more data broker profiles represents the data broker of the one or more data brokers.

8. The method according to claim 1, wherein sending the request to the data broker includes one of requesting deletion of the PII from a data store of the data broker, or requesting that the data broker not share or sell the PII of the first user.

9. The method according to claim 8, further comprising:
   notifying the first user when the request to delete the PII has been complied with.

10. The method according to claim 1, wherein determining the threat level to the first user for the data broker further includes processing a compliance score for the data broker using a machine learning model that is trained using one or both of:
   a time elapsed between a request to delete PII of a second user being sent to the data broker and the PII of the second user being deleted by the data broker, or
   a time elapsed between a request not to share or sell the PII of the second user being sent to the data broker and the data broker sharing or selling the PII of the second user with a third party, and
   to predict the threat level to the first user for the data broker.

11. The method according to claim 1, further comprising:
   responsive to receiving an input for selecting one or more filters and selecting one or more data broker profiles, sending the request to the one or more data brokers, wherein the one or more filters is selected from a group consisting of a threat level filter, an amount of PII filter, a type of PII filter, an age of the PII filter, or a user rating filter.

12. The method according to claim 1, further comprising:
   responsive to sending a request to the data broker, providing a user interface to the data broker for the data broker to provide a survey to the first user, including one or more of:
      a response for the data broker to comply with the request from the first user,
      an explanation of the type or amount of PII the data broker is in possession of,
      an explanation of how the data broker obtained the PII of the first user,
      an explanation of how the data broker uses the PII of the first user,
      a petition for continued use of the PII of the first user by the data broker,
      an explanation of advantages to the first user for continued use of the PII of the first user, and
      an offer compensation to the first user for continued use of the PII of the first user.

13. A non-transitory computer readable medium, when processed by one or more processors, cause the one or more processors to execute:
   a personally identifiable information (PII) logic configured to establish a PII profile for a first user including PII;
   a data broker logic configured to:
      analyze one or more data brokers for PII that relates to the first user,
      determine a threat level to the first user for a data broker by processing a compliance score for the data broker using a machine learning model that is trained, in part, using one or both of:
         a) a time elapsed between a request to delete PII of a second user being sent to the data broker and the PII of the second user being deleted by the data broker, or
         b) a time elapsed between a request not to share or sell the PII of the second user being sent to the data broker and the data broker sharing or selling the PII of the second user with a third party, and predict the threat level to the first user for the data broker; and a user interface logic configured to render a dynamically updatable interface including one or more data broker profiles arranged in order of threat level to the first user, and configured to receive an input, and responsive to the input, send a request to the data broker or remove a data broker profile of the one or more data broker profiles from the dynamically updatable interface.

14. The non-transitory computer readable medium according to claim 13, wherein the PII logic is further configured to request an input from the first user for initial PII and query a third party data store for additional PII of the first user.

15. The non-transitory computer readable medium according to claim 13, wherein the data broker logic is further configured to analyze information retrieved from the one or more data brokers and information retrieved from the PII profile, and use one or more predetermined rule sets and weightings to determine an accuracy score for the information retrieved from the one or more data brokers, to predict if the information from the one or more data brokers is related to the first user.

16. The non-transitory computer readable medium according to claim 15, wherein the data broker logic is further configured to receive additional input from the first user confirming or rejecting the information retrieved from the one or more data brokers as relating to the first user.

17. The non-transitory computer readable medium according to claim 13, wherein the data broker logic is further configured to determine the threat level to the first user by analyzing, using one or more predetermined rule sets and weightings, one or more of:
   an industry with which the data broker is associated,
   a user experience rating associated with the data broker as provided by one or more second users, or
   a compliance score determined by a response by the data broker to a request from the one or more second users.

18. The non-transitory computer readable medium according to claim 13, wherein a first data broker profile of the one or more data broker profiles represents the data broker of the one or more data brokers.

19. The non-transitory computer readable medium according to claim 13, wherein the dynamically updatable interface is provided on a touch sensitive screen and wherein receiving an input to the dynamically updatable interface includes swiping an aspect of a data broker profile in a first direction or swiping the aspect of the data broker profile in a second direction opposite the first direction.

20. The non-transitory computer readable medium according to claim 13, wherein sending the request to the data broker includes one of a "Remove" request that requests the data broker to delete the PII from a data store of the data broker, or and "Opt-Out" request that requests the data broker to not share or sell the PII of the first user.

21. The non-transitory computer readable medium according to claim 13, wherein the user interface logic is further configured to receive additional input selecting one or more filters and one or more data broker profiles, and send the request to the one or more data brokers, wherein the one or more filters is selected from a group consisting of a threat level filter, an amount of PII filter, a type of PII filter, an age of the PII filter, or a user rating filter.

22. The non-transitory computer readable medium according to claim 13, wherein the one or more processors further execute:
   a petition logic configured to provide a user interface to the data broker and to provide a survey for the first user including one or more of:
   a response for the data broker to comply with the request from the first user,
   an explanation of the type or amount of PII the data broker is in possession of,
   an explanation of how the data broker obtained the PII of the first user,
   an explanation of how the data broker uses the PII of the first user,
   a petition for continued use of the PII of the first user by the data broker,
   an explanation of advantages to the first user for continued use of the PII of the first user, or
   an offer compensation to the first user for continued use of the PII of the first user.

23. A network device, comprising:
one or more processors; and
memory communicatively coupled with the one or more processors, the memory comprises machine readable instructions that when executed by the one or more processors, cause the one or more processors to execute:
   a personally identifiable information (PII) logic configured to establish a PII profile for a first user including PII;
   a data broker logic configured to:
      analyze one or more data brokers for the PII that relates to the first user; and
      determine a threat level to the first user for a data broker of the one or more data brokers by analyzing, using one or more predetermined rule sets and weightings or a machine learning schema, one or more of:
         a type or sensitivity of PII of the first user possessed by the data broker;
         an amount of the PII of the first user possessed by the data broker; and
         an amount of the PII of the first user, which that is shared or sold by the data broker with a third party; and
   a user interface logic configured to render a dynamically updatable interface displaying one or more data broker profiles arranged in order of threat level to the first user, and configured to receive an input, and responsive to the input, send a request to the data broker or remove a first data broker profile from the dynamically updatable interface, wherein the dynamically updatable interface is provided on a touch sensitive screen and wherein receiving the input to the dynamically updatable interface includes swiping an aspect of a data broker profile in a first direction or swiping the aspect of the data broker profile in a second direction opposite the first direction.

* * * * *